US009473202B2

(12) United States Patent
Fix et al.

(10) Patent No.: US 9,473,202 B2
(45) Date of Patent: *Oct. 18, 2016

(54) DETECTION OF SCRAMBLING CODE CONFUSION

(71) Applicant: AT&T MOBILITY II LLC, Atlanta, GA (US)

(72) Inventors: Jeremy Fix, Acworth, GA (US); Sheldon Kent Meredith, Marietta, GA (US); Rick Tipton, Corryton, TN (US)

(73) Assignee: AT&T MOBILITY II LLC, Atlanta, GA (US)

( * ) Notice: Subject to any disclaimer, the term of this patent is extended or adjusted under 35 U.S.C. 154(b) by 2 days.

This patent is subject to a terminal disclaimer.

(21) Appl. No.: 14/926,714

(22) Filed: Oct. 29, 2015

(65) Prior Publication Data

US 2016/0049989 A1    Feb. 18, 2016

Related U.S. Application Data

(63) Continuation of application No. 14/627,031, filed on Feb. 20, 2015, now Pat. No. 9,204,324, which is a continuation of application No. 13/537,697, filed on Jun. 29, 2012, now Pat. No. 8,995,986.

(51) Int. Cl.
*H04B 1/7103* (2011.01)
*H04B 1/708* (2011.01)
*H04B 1/7073* (2011.01)
(Continued)

(52) U.S. Cl.
CPC ............ *H04B 1/7103* (2013.01); *H04B 1/707* (2013.01); *H04B 1/708* (2013.01); *H04B 1/70735* (2013.01); *H04W 24/04* (2013.01)

(58) Field of Classification Search
CPC ............... H04W 24/04; H04B 1/7103; H04B 1/70735; H04B 1/707; H04B 1/708
See application file for complete search history.

(56) References Cited

U.S. PATENT DOCUMENTS

| 6,535,495 | B1 | 3/2003 | Moulsley |
| 6,785,250 | B2 | 8/2004 | Vayanos et al. |
| 7,453,841 | B2 | 11/2008 | Motegi et al. |

(Continued)

OTHER PUBLICATIONS

Final Office Action dated May 14, 2014 for U.S Appl. No. 13/537,697, 26 pages.

(Continued)

*Primary Examiner* — George Eng
*Assistant Examiner* — Joseph Dean, Jr.
(74) *Attorney, Agent, or Firm* — Amin, Turocy & Watson, LLP

(57) ABSTRACT

Detection of a confusion caused by scrambling code reuse is provided herein. Timing measurements, as observed by a mobile device, and an identification of primary scrambling codes associated with the timing measurements are captured. The timing measurements are identified by the primary scrambling codes for the particular radio measured. The mobile device also reports its location information. Radios for which timing measurements have been received are paired. Based on the paired radios and a history of observed time difference reference values for radio pairs, comparisons are made between paired radios having at least one common radio. Radios, exhibiting a set of values that is near an expected range, are removed from the analysis. Radios, exhibiting two sets of values that are distinct, are isolated in order to identify the radio that is causing the scrambling code confusion.

20 Claims, 14 Drawing Sheets

(51) Int. Cl.
*H04W 24/04* (2009.01)
*H04B 1/707* (2011.01)

(56) References Cited

U.S. PATENT DOCUMENTS

| | | |
|---|---|---|
| 7,647,060 B2 | 1/2010 | Kawamura et al. |
| 8,509,806 B2 | 8/2013 | West et al. |
| 2004/0087277 A1 | 5/2004 | Edge et al. |
| 2004/0166901 A1 | 8/2004 | Umesh et al. |
| 2005/0099972 A1 | 5/2005 | Motegi et al. |
| 2008/0039141 A1 | 2/2008 | Claussen et al. |
| 2008/0075208 A1 | 3/2008 | Li et al. |
| 2009/0047956 A1 | 2/2009 | Moe et al. |
| 2010/0203891 A1 | 8/2010 | Nagaraja et al. |
| 2010/0304748 A1 | 12/2010 | Henttonen et al. |
| 2011/0237269 A1 | 9/2011 | Chen |
| 2012/0040676 A1 | 2/2012 | Jang et al. |
| 2013/0100880 A1 | 4/2013 | Moren et al. |
| 2013/0234894 A1 | 9/2013 | Oka et al. |
| 2015/0163685 A1* | 6/2015 | Fix ............... H04W 24/04 455/425 |

OTHER PUBLICATIONS

Final Office Action dated Oct. 11, 2013 for U.S. Appl. No. 13/537,697, 25 pages.

Final Office Action dated Mar. 26, 2015 for U.S. App. No. 14/627,031, 33 pages.

Notice of Allowance dated Jul. 30, 2015 for U.S. Appl. No. 14/627,031, 41 pages.

* cited by examiner

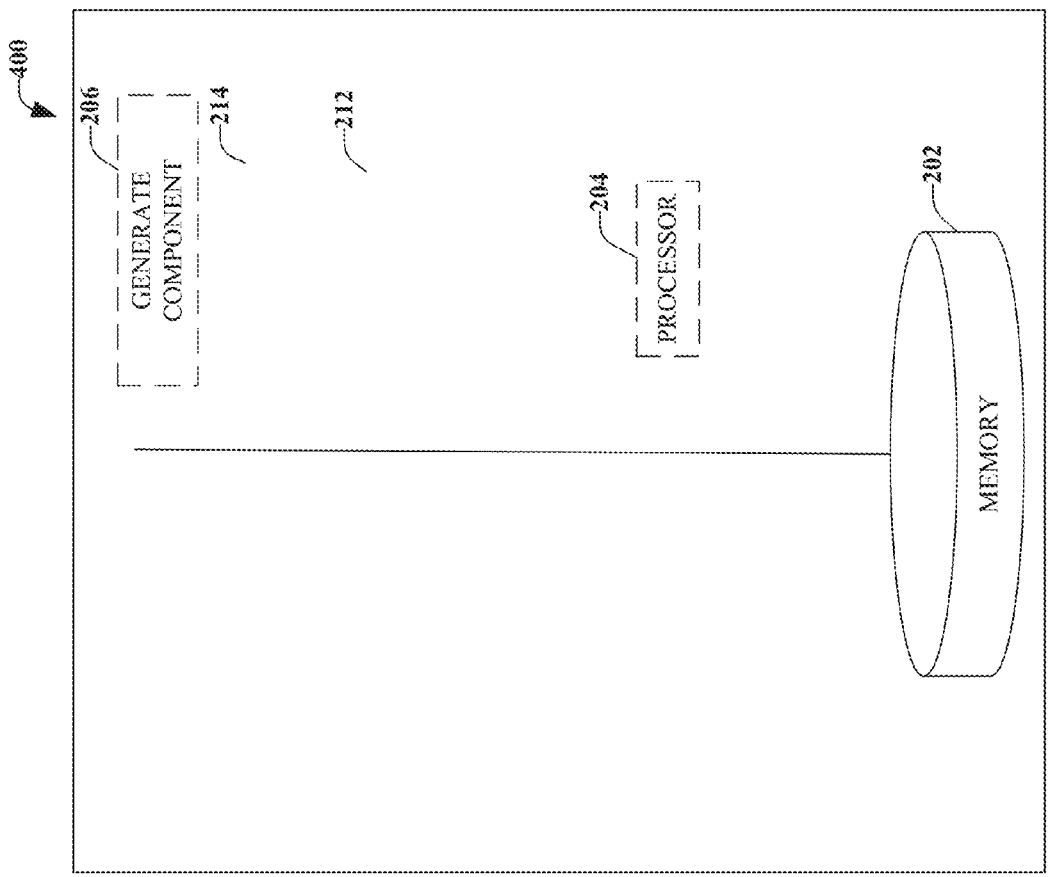
FIG. 4

DETECTION OF SCRAMBLING CODE CONFUSION

CROSS-REFERENCE TO RELATED APPLICATIONS

This application is a continuation of, and claims priority to each of, U.S. patent application Ser. No. 14/627,031, filed on Feb. 20, 2015, now issued as U.S. Pat. No. 9,204,324, entitled "DETECTION OF SCRAMBLING CODE CONFUSION," which is a continuation of U.S. patent application Ser. No. 13/537,697, filed on Jun. 29, 2012, now issued as U.S. Pat. No. 8,995,986, entitled "DETECTION OF SCRAMBLING CODE CONFUSION." The entireties of the foregoing applications are hereby incorporated by reference herein.

TECHNICAL FIELD

The subject disclosure relates to wireless communications and, more particularly, to detection of scrambling code confusion in a wireless communications environment.

BACKGROUND

Wide adoption of mobile devices along with ubiquitous cellular data coverage has resulted in an explosive growth of mobile applications that expect always-accessible wireless networking. This explosion has placed strains on resources that are scarce in the mobile world. On the user side, dropped calls have been blamed for user dissatisfaction. On the network side, instances of dropped calls can occur due to scrambling code confusion or scrambling code conflict, which occurs when a mobile device encounters two sectors that utilize the same scrambling code and the network cannot identify on which sector the mobile device is reporting.

BRIEF DESCRIPTION OF THE DRAWINGS

Various non-limiting embodiments are further described with reference to the accompanying drawings in which:

FIG. 4 illustrates an example, non-limiting system for detecting a source of a scrambling code conflict and implementing an action related to the source of the conflict, according to an aspect;

DETAILED DESCRIPTION

Figure 1:
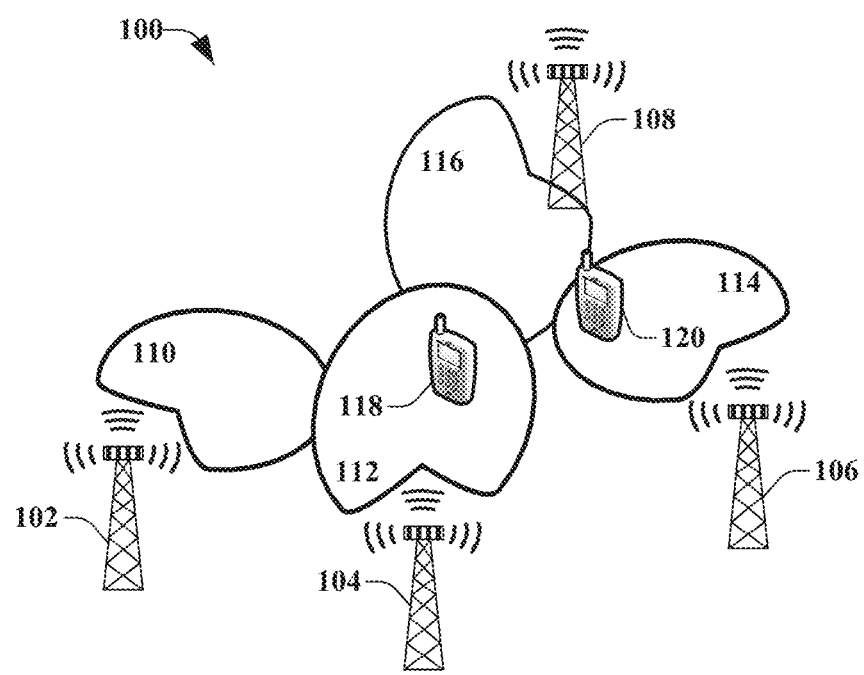
FIG. 1 illustrates an example, non-limiting wireless communications environment in which the disclosed aspects can be utilized, according to an embodiment.

Aspects of the subject disclosure will now be described more fully hereinafter with reference to the accompanying drawings in which example embodiments are shown. In the following description, for purposes of explanation, numerous specific details are set forth in order to provide a thorough understanding of the various embodiments. However, the subject disclosure may be embodied in many different forms and should not be construed as limited to the example embodiments set forth herein.

It is noted that although various aspects and embodiments are discussed herein with respect to Universal Mobile Telecommunications System (UMTS), the subject disclosure is not limited to a UMTS implementation. For example, aspects or features of the disclosed embodiments can be exploited in substantially any wireless communication technology. Such wireless communication technologies can include Universal Mobile Telecommunications System (UMTS), Code Division Multiple Access (CDMA), Wi-Fi, Worldwide Interoperability for Microwave Access (Wi-MAX), General Packet Radio Service (GPRS), Enhanced GPRS, Third Generation Partnership Project (3GPP) Long Term Evolution (LTE), Third Generation Partnership Project 2 (3GPP2) Ultra Mobile Broadband (UMB), High Speed Packet Access (HSPA), Evolved High Speed Packet Access (HSPA+), High-Speed Downlink Packet Access (HSDPA), High-Speed Uplink Packet Access (HSUPA), Zigbee, or another IEEE 802.XX technology. Additionally, substantially all aspects disclosed herein can be exploited in legacy telecommunication technologies.

The embodiments contained herein are not intended, however, as an extensive or exhaustive overview. Instead, the sole purpose of this detailed description is to present some concepts related to some example, non-limiting embodiments in a simplified form as a prelude to the more detailed description of the various embodiments that follow.

In an example embodiment, an aspect relates to a system that can include at least one memory and at least one processor. The memory can store computer-executable instructions and the at least one processor can be communicatively coupled to the at least one memory. The processor can facilitate execution of the computer-executable instructions to at least construct a history of a plurality of observed time difference reference values for a plurality of radio pairs based on timing measurements and location information reported by a plurality of mobile devices. Based on a comparison of the plurality of observed time difference reference values for sets of the plurality of radio pairs that share a common radio, the processor can also facilitate execution of the computer-executable instructions to identify a radio for the sets of the plurality of radio pairs as a cause of a scrambling code conflict resulting from a mobile device of the plurality of mobile devices detecting two radios having the same scrambling code.

Another example embodiment relates to a method that can include receiving, by a system comprising a processor, timing measurements and location information from a plurality of mobile devices. The timing measurements can comprise identification information associated with respective radios. The method can also include establishing, by the system, a set of reference values for radio pairs from the timing measurements and evaluating, by the system, a first subset of the set of reference values. The first subset of reference values comprise timing measurements for a first radio of the radio pairs. The method can also include determining, by the system, as a result of the evaluating that the first radio contributes to at least a set of the plurality of mobile device receiving communication from two radios that use a same scrambling code resulting in a scrambling code conflict.

A further example embodiment relates to a non-transitory computer-readable storage medium storing computer-executable instructions that, in response to execution, cause a system including a processor to perform operations. The operations can include storing a plurality of observed time difference reference values for a plurality of radio pairs based on timing measurements and location information reported by a plurality of mobile devices. The operations can also include comparing the plurality of observed time difference reference values for sets of radio pairs of the plurality of radio pairs. The sets of radio pairs share a common radio. The operations further include identifying the common radio as a cause of scrambling code confusion resulting from two radios using a same scrambling code.

Referring initially to FIG. 1, illustrated is an example, non-limiting wireless communications environment 100 in which the disclosed aspects can be utilized, according to an embodiment. A wireless communications environment 100 can comprise any number of sectors (e.g., sites, cells, and so forth). The illustrated wireless communications environment 100 can include a first sector 102, a second sector 104, a third sector 106, and a fourth sector 108, although more (or fewer) than four sectors can be utilized in a wireless communications environment. Each sector has a respective geographic area or coverage area. For example, first sector 102 has a first coverage area 110, second sector 104 has a second coverage area 112, third sector 106 has a third coverage area 114, and fourth sector 108 has a fourth coverage area 116.

Also illustrated are two mobile devices, labeled as a first mobile device 118 and a second mobile device 120, although more than two mobile devices can be operated within the wireless communications environment 100. As utilized herein, a mobile device can include a UMTS-based electronic device, such as, but not limited to, a cell phone, a PDA (personal digital assistant), a media player, a digital camera, a media recorder, a laptop, a personal computer, a printer, a scanner, a tablet, a GPS (global positioning system) module, a gaming module, and so forth. Further, the device can also include UMTS-based appliances that can be employed, for example, in a home, office, building, retail store, restaurant, hotel, factory, warehouse, and so on. As previously noted, although the various aspects are discussed herein with reference to UMTS, the aspects are not limited to an UMTS implementation. Instead, the various aspects can be utilized with other network technologies and UMTS technology is utilized herein for purposes of simplicity.

Each sector can be assigned a different scrambling code, which is a code utilized to distinguish each sector's transmissions from transmissions from other sectors. For example, scrambling codes can differentiate WCDMA (Wideband CDMA) radios from one another, as detected by mobile devices (e.g., user equipment). Radio Access Network (RAN) planners have about 512 (e.g., numbered 0 through 511) possible scrambling codes to assign to the radios (e.g., sectors). Although each cell should be assigned a unique scrambling code, since there are a finite number of scrambling codes and there can be thousands of cells, some reuse of each scrambling code might be necessary in a wireless communications environment. To facilitate the scrambling code reuse, the RAN planners consider the radios that are located in proximity to each other and attempt to distribute the scrambling codes so that two or more sectors having the same scrambling code are not able to be detected by a mobile device at the same time. If the mobile device could encounter and measure timing parameters of both the sectors (e.g., a first sector and a second sector) with the same scrambling code at the same time, confusion can result because the mobile device might intend to communicate with a first sector, but is in fact communicating with the second sector. Therefore, the network cannot identify on which cell the mobile device is reporting. Another problem that can occur is interference among cells sharing the same scrambling code. Poor scrambling code reuse planning can also result in dropped calls.

It should be noted that although generally 512 scrambling codes are available (e.g., numbered 0 to 511), some scrambling codes might be reserved and not available for assignment to cells. For example, the available scrambling codes can be 0 through 503, 510, and 511 (where scrambling codes 504 through 509 can be reserved).

For example, in dense urban settings, user locations (e.g., mobile device locations) can vary by various geographic coordinates including latitude, longitude, and altitude (e.g., three-dimensions). In many cities (e.g., Manhattan, Los Angeles, San Francisco, Chicago, and so forth), numerous small footprint sites exist to cover smaller areas. Users, through their respective mobile devices, might be more prone to see many sites both near and far away due to tall buildings, hilltops, and so forth. With the higher penetration of sites in smaller geographic areas, scrambling code reuse can become difficult, resulting in a scrambling code conflict, which can be hard to detect as problematic.

The various aspects disclosed herein can provide a direct means to determine when scrambling code conflict is occurring by using timing measurements to differentiate between two source sites. Timing measurements can be translated to distance with a greater degree of accuracy as compared to RSCP (Received Signal Code Power). For example, detection of conflicting mobile device to site distance can be an indication of scrambling code confusion.

As the first mobile device 118 and the second mobile device 120 are moved within the wireless communications environment 100 and/or are moved into or out of the coverage area(s) of the wireless communications environment 100, the device might be able to measure timing for multiple sites. For example, first sector 102 (and first mobile device 118) are located at a high altitude (e.g., at the top of large building) and third sector 106 is within sight of the first mobile device 118. However, the distance between first sector 102 and third sector 106 is far enough that when scrambling code assignment with reuse was established, both the first sector 102 and third sector 106 were assigned the same scrambling code, since it was not foreseeable that a conflict would occur between these sites. However, in use, the mobile device is able to detect communications from both sectors, which utilize the same scrambling code, and confusion can occur because the device is not aware that it is in communication with two different sectors that use the same scrambling code. Such scrambling code conflicts and the resulting scrambling code confusion can cause numerous issues for the mobile device during operation. These issues can include dropped calls, poor communication quality, and failed handovers.

Figure 2:
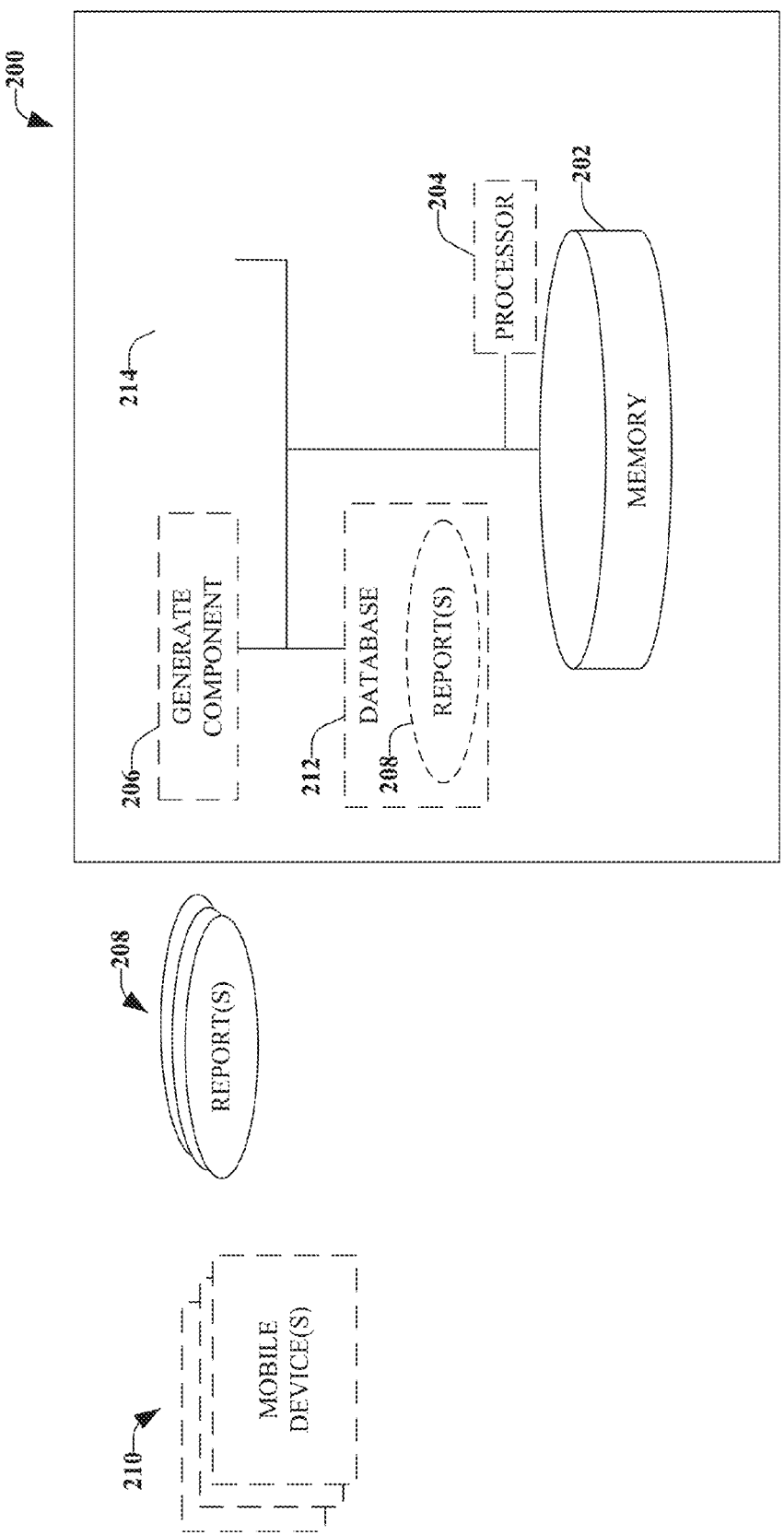
FIG. 2 illustrates an example, non-limiting system configured to detect scrambling code conflicts, according to an aspect.

FIG. 2 illustrates an example, non-limiting system 200 configured to detect scrambling code conflicts, according to an aspect. Benefits of removing scrambling code conflicts utilizing the disclosed aspects can include improved network performance, a reduction in the number of dropped calls, improvement of call quality and related issues, and improvement of handover related issues (e.g., mobility). Further, the disclosed aspects can be reactionary and can provide an effective means to detect problems that could arise from new radio additions and/or new radio code plans.

System 200 can be implemented in a network (e.g., base station, access point, sector, NodeB, site, and so forth). As previously noted, although the various aspects are discussed herein with reference to UMTS, the disclosed aspects are not limited to an UMTS implementation. Instead, the various aspects can be utilized with other network technologies and UMTS technology is utilized herein for purposes of simplicity while explaining the various aspects.

System 200 can include at least one memory 202 that can store computer executable components and computer executable instructions. System 200 can also include at least one processor 204, communicatively coupled to the at least one memory 202. Coupling can include various communications including, but not limited to, direct communications, indirect communications, wired communications, and/or wireless communications.

The at least one processor 204 can facilitate execution of the computer executable components and instructions stored in the memory 202. It is noted that although one or more computer executable components may be described herein and illustrated as components separate from memory 202 (e.g., operatively connected to memory), in accordance with various embodiments, the one or more computer executable components could be stored in the memory 202. Further, while various components have been illustrated as separate components, it will be appreciated that multiple components can be implemented as a single component, or a single component can be implemented as multiple components, without departing from example embodiments.

System 200 can also include a generate component 206 that can be configured to construct a history of observed time difference reference values for radio pairs based on reports 208 transmitted by a multitude of mobile devices 210 (e.g., first mobile device 118, second mobile device 120, and so forth). For example, each mobile device can measure multiple radios during defined events related to soft handover or at various other times. These measurements can be reported, by the mobile device, to the network (e.g., to system 200). In an implementation, the measurements can be reported by the mobile device in a Radio Resource Control (RRC) Measurement Report. In another implementation, the measurements can be received as reference signal time difference (RSTD) measurements.

The measurements can comprise, for each radio (e.g., radio for each sector), a primary scrambling code and a timing measurement (Tm) value. The primary scrambling code can be utilized to distinguish each sector's transmissions from transmissions from other sectors (or cells). The Tm value is a timing measurement representing the difference between the SFN (System Frame Number) and the CFN (Connection Frame Number) as received at the mobile device for each radio. An observed time difference (OTD) calculation is a timing difference between radios, where:

$$OTDji=Tmj-Tmi$$

where Tmj is a timing measurement of radio j and Tmi is a timing measurement of radio i, as measured by the mobile device.

Another report conveyed by the mobile devices, and received at the system 200, can be a location report that identifies the geographic coordinates or location (e.g., latitude, longitude, altitude) of the mobile device at the time the report is generated by the mobile device. In an implementation, the location report can be a RANAP (Radio Access Network Application Protocol) Location Report that can be conveyed to the network (e.g., to a reception component) when requested by an external service through the control plane, or at a different time.

The one or more reports 208 received from the mobile devices 210 (e.g., a mobile device can convey more than one report and/or multiple mobile devices can transmit one or more reports) can be retained in a database 212 (as illustrated) or in another computer readable storage medium. It is noted that a database (e.g., database 212) can include volatile memory or nonvolatile memory, or can include both volatile memory and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which can operate as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory (e.g., data stores, databases, and so on) of the various disclosed aspects is intended to comprise, without being limited to, these and any other suitable types of memory. In an aspect, database 212 is included as a component within the disclosed system(s). However, according to other aspects, the database 212 can be located remote from the system(s) but can be accessed by the system(s), such as over an air interface.

Also included in system 200 is an analysis component 214 that can be configured to compare the observed time difference reference values for sets of radio pairs that share a common radio. For example, a first mobile device reports timing measurements for Sector A, Sector B, and Sector D and the following radio pairs are created (where 1 represents the first mobile device: $AB_1$, $AD_1$, $BA_1$, $BD_1$, $DA_1$, $DB_1$. A second mobile device reports timing measurements for Sector B, Sector C, and Sector D and the following radio pairs are created (where 2 represents the second mobile device): $BC_2$, $BD_2$, $CB_2$, $CD_2$, $DB_2$, and $DC_2$. Further, a third mobile device reports timing measurements for Sector B, Sector E, and Sector F and the following radio pairs are created (where 3 represented the third mobile device): $BE_3$, $BF_3$, $EB_3$, $EF_3$, $FB_3$, and $FE_3$. In this example, radio pairs $AB_1$, $BA_1$, $DB_1$, $BC_2$, $BD_2$, $CB_2$, $DB_2$, $BE_3$, $BF_3$, $EB_3$, and $FB_3$ share a common radio (e.g., Sector B). In an implementation, the radio pairs and associated values can be retained in a database, which can be database 212 or a different database.

System 200 can also include an assessment component 216 that can be configured to identify at least one radio from the set of radio pairs, where the at least one radio is a cause of a scrambling code conflict. The scrambling code conflict or confusion can result from a mobile device detecting two radios with a same scrambling code. According to an implementation, through a process of elimination, assessment component 216 can remove from the evaluation radios that have been determined not to be the cause of scrambling code confusion. In an example, assessment component 216 can evaluate the pairings associated with the various sectors (or radios) and in each case (e.g., for each pairing) there might be a common link of scrambling code confusion, however, between other pairs there might not be scrambling code confusion.

In an implementation, layer three messages can be collected by network IuB probes or by vendor provided tracing applications. The disclosed aspects can collect RANAP Location Reports and RRC Measurement Reports for all WCDMA devices active in the network. As RANAP Location reports are received, RRC Measurement Reports for the same mobile device can be collected and analyzed. The RANAP Location Report can provide a fixed location for the mobile device, which can be an AGPS (Assisted Global Positioning System) mobile device. The RANAP Location Reports can be matched with RRC Measurement Reports, such as through interpolation or extrapolation. The result of the matching can be a temporary link between the RRC Measurement Report with the RANAP Location Report, which can be linked with minimal, if any, error.

Further to this implementation, from the RRC Measurement Report, a list of observed timing difference values ($O_{ji}$ values) can be constructed, where $O_{ji}$ is equal to the timing measurement of site j (as measured by the mobile device) minus the timing measurement of site i (as measured by the mobile device):

$$O_{ji} = TM_j - TM_i$$

The $O_{ji}$ can be translated to an $O_{ji}R$ (Reference) value that removes the known propagation delay known from the actual mobile device location. Thus, the reference value ($O_{ji}R$) is equal to the observed time difference ($O_{ji}$) minus the propagation delay ($D_{ij}R$).

$$O_{ij}R = O_{ji} - D_{ij}R$$

where $D_{ij}R$ represents the propagation delay difference for the known mobile device location and the known radio locations (e.g., Site i and Site j). A history of $O_{ji}R$ values can be built for each Radio Pair ij. Detection of a scrambling code conflict issue occurs when two distinct cluster of samples within the buffer exist. The specific case can be reported to allow radio planners to rectify the conflict. In some implementations, the detection of the scrambling code conflict can result in automated reassignment of scrambling codes.

Figure 3:
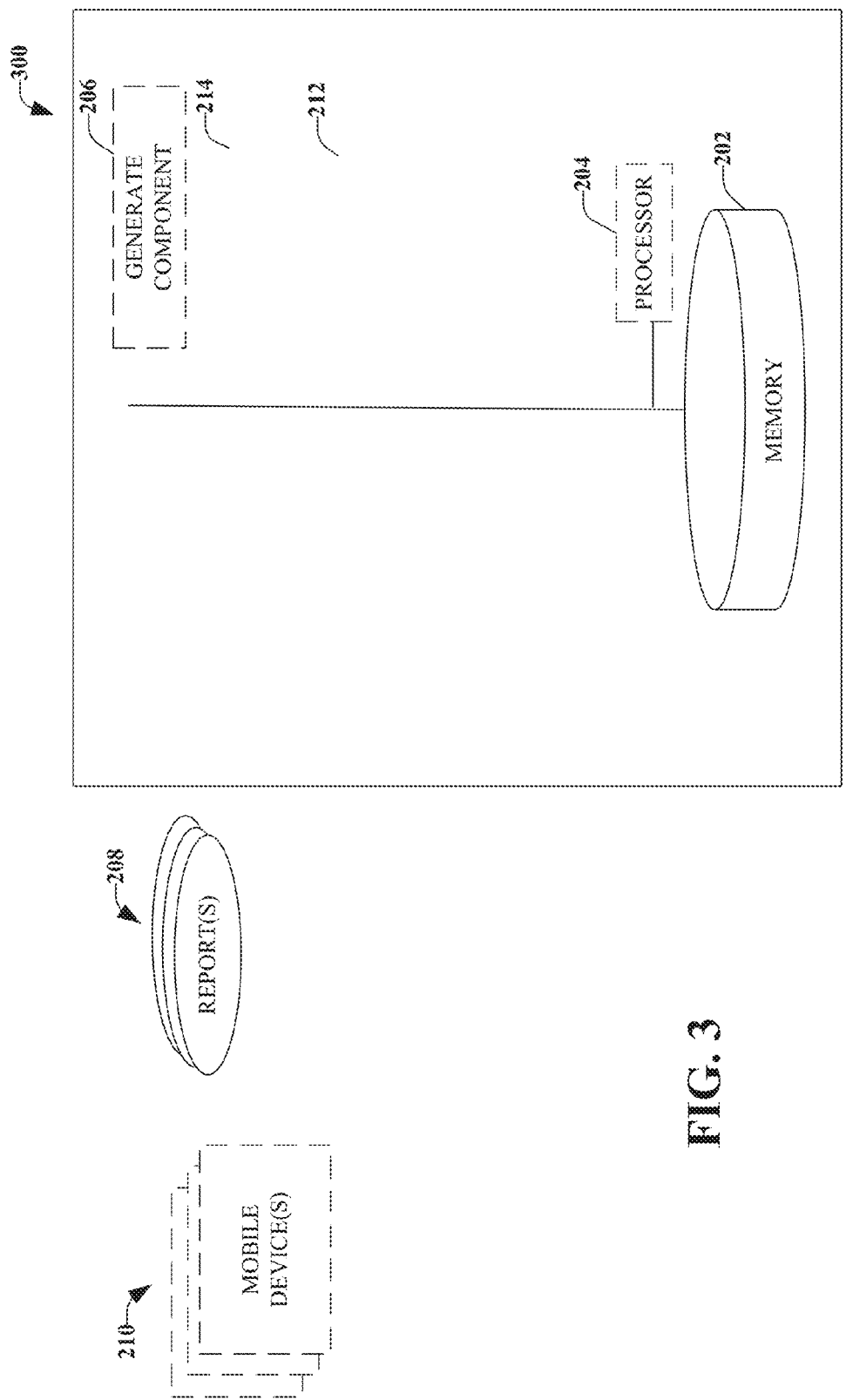
FIG. 3 illustrates an example, non-limiting system for building a history of observed time difference reference values in order to automatically detect scrambling code conflicts, according to an aspect.

FIG. 3 illustrates an example, non-limiting system 300 for building a history of observed time difference reference values in order to automatically detect scrambling code conflicts, according to an aspect. Included in system 300 is a mapping component 302 that can be configured to match a location of a mobile device (from the set of mobile devices 210) to a set of timing measurements reported by the respective mobile device. Each timing measurement in the set of timing measurements can be associated with a radio identified by its primary scrambling code. Further, each mobile device can report its respective location and/or timing measurements.

An association component 304 can be configured to identify pairs of radios from the radios identified in the set of timing measurements. For example, pairs of radios can be identified based on timing measurements from each mobile device. Thus, if a first mobile device reports timing measurements for three radios, association component 304 can identify pairs of radios from the three radios. Further, if a second mobile device reports timing measurements for four radios, association component 304 can identify pairs of radios from the four radios. The identification of the radio pairs from the timing measurements reported by the first mobile device is independent of the creation of the radio pairs from the timing measurements reported by the second mobile device (and subsequent mobile devices).

Also included in system 300 is a computation component 306 that can be configured to calculate an observed time difference value for each pair of radios. In an implementation, the pair of radios comprises a first radio and a second radio. Further to this implementation, computation component 306 subtracts a first timing measurement of a first radio from a second timing measurement of a second radio (as measured by the mobile device) to calculate the observed time difference value. For example, the first radio is Radio I and the second radio is Radio J. The observed time difference of these radios ($O_{ji}$) is the timing measurement of Radio I subtracted from the timing measurement of Radio J ($O_{ji} = TM_j - TM_i$) For example, each Tm value, when compared with all other radio Tm values, yields an observed time difference (OTD), where $OTD_{ji} = Tm_j - Tm_i$, where j and i represent Radio j and Radio i, respectively. The location report or current location provides a fixed reference location for each Tm value. In the case of a UMTS network, which might not be GPS synchronized, the fixed reference location can be established based on the location report when the location report is received at about the same time the Tm values are received. Once the fixed reference location is obtained, the OTD measures can be recorded (e.g., retained in database 212). Overtime, as many measurements are obtained, a single radio issue can be detected, as compared with all other radios for which information has been received.

A reference value component 308 can be configured to remove a propagation delay difference ($D_{ji}R$) from the observed time difference value ($O_{ji}$) to derive an observed time difference reference value ($O_{ji}R$) ($O_{ji}R = O_{ji} - D_{ji}R$). In an example, the propagation delay can be calculated for each pair of radios based in part on the location information reported by each mobile device.

Also included in system 300 can be an update component 310 that can be configured to populate a data store (e.g., database 212 or another database) with the observed time difference reference value for each pair of radios. The database that comprises the observed time difference reference values can be saved as historical data and utilized for later detection of scrambling code conflicts according to the disclosed aspects.

FIG. 4 illustrates an example, non-limiting system 400 for detecting a source of a scrambling code conflict and implementing an action related to the source of the conflict, according to an aspect. System 400 can include a reception component 402 that can be configured to receive the reports 208 from the mobile devices 210.

Each mobile device included in the set of mobile devices 210 can be identified based on its international mobile subscriber identity (IMSI 404), which is a unique identification associated with each mobile device. The IMSI 404 can be a number having 15 digits or any other number of digits. The IMSI 404 can be included in one or more reports 208 transmitted by each mobile device.

Each mobile device can also report timing measurements values (Tm values 406), which are the timing measurements as measured by each mobile device. In an implementation, the Tm values 406 can be reported in an RRC measurement report or a different type (or name) of report. Each Tm value 406 can be associated with a primary scrambling code (PSC 408), which differentiates radios (e.g., WCDMA) radios from one another, as detected by the mobile device. The PSC 408 can be transmitted in the RRC measurement report according to an implementation.

Each mobile device can also report its current location 410 (e.g., position information), which can include various geographic coordinates including latitude, longitude, and/or altitude. In an implementation, the current location 410 of the mobile device can be received in a RANAP location report or a different type (or name) of report.

As stated above, the various information from each mobile device (e.g., IMSI 404, Tm 406, PSC 408, current location 410) can be received by reception component 402. For example, the reception component 402 can receive the timing measurements in radio resource measurement reports transmitted by respective mobile devices. Further to this example, the reception component 402 can receive the location information in radio access network application protocol location reports transmitted by the respective mobile devices. In another example, the reception component 402 can be configured to receive the timing measurements as reference signal time difference values reported by respective mobile devices.

Further, the various information can be retained in database 212. The various information and/or reports can be retained in the database (or other storage medium) in any type of format (e.g., table, list, and so forth) that allows the information to be accessed, as needed.

Also included in system 400 can be an output component 412 that can be configured to output a report that identifies at least one radio as the cause of the scrambling code conflict. In an example, the report can be utilized by network planners to redistribute scrambling codes among the sites in order to mitigate scrambling code confusion.

For example, output component 412 can be configured to convey information to a network operator or another user and/or entity (e.g., the Internet, another system, a computer, machinery, and so forth), hereinafter referred to as users and/or entity, depending on the context. At substantially the same time as the analysis is completed by system 400 (or sometime thereafter), output component 412 can convey the information to a user and/or entity. In an implementation, the analysis information can be transmitted in an exception report that includes the identified sector and/or can include analysis and information related to the other sectors (e.g., sector identification, timing measurements reported by the mobile devices, an identification of the type of each mobile device, and so forth). Based on the analysis received from output component 412, the scrambling code of the identified site can be changed to a different scrambling code or another action can be performed as deemed appropriate based on various considerations including standard operating procedures related to the network.

Figure 5:
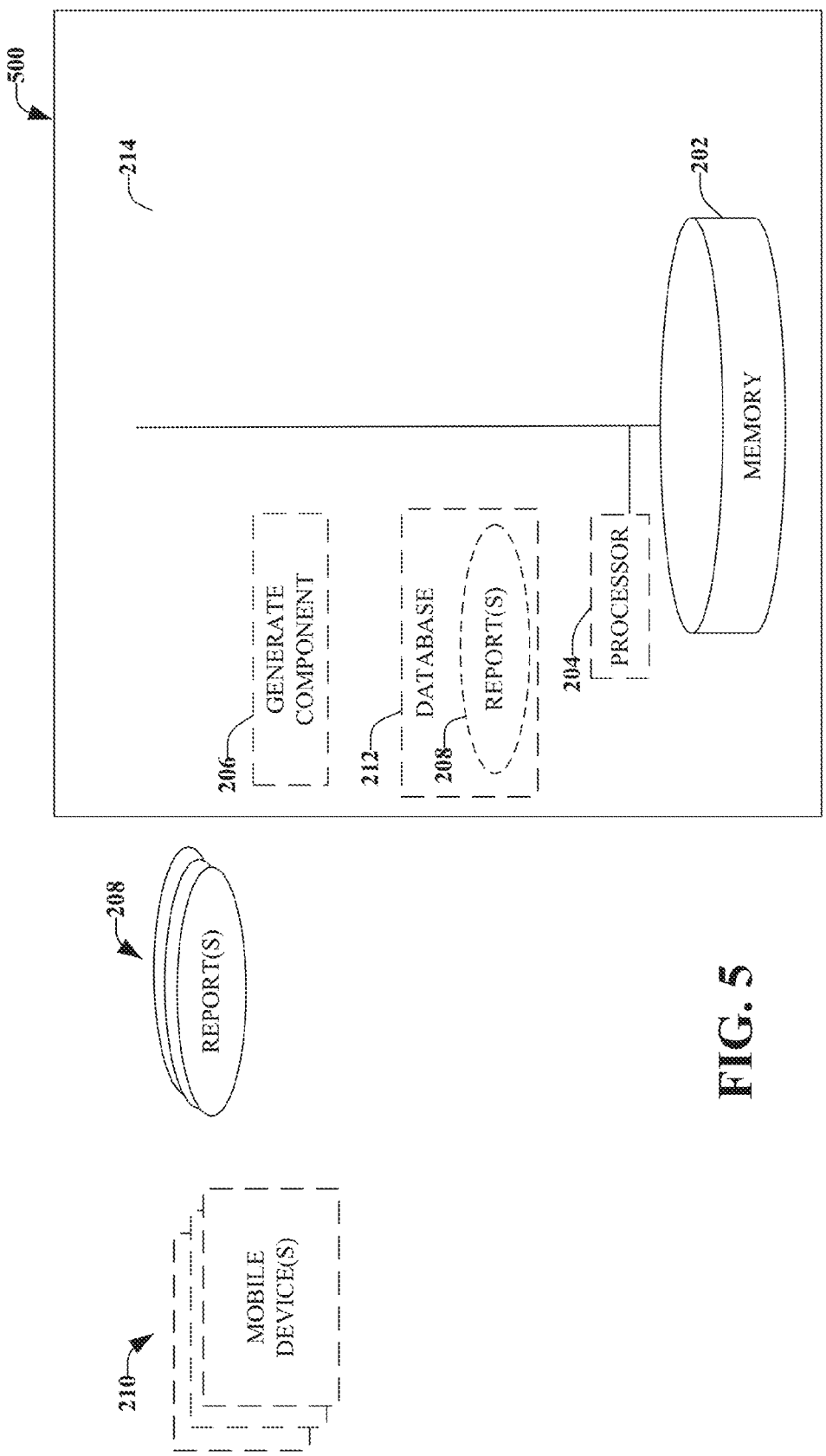
FIG. 5 illustrates another example, non-limiting system configured to selectively identify at least one radio that is causing the scrambling code conflict, according to an aspect.

FIG. 5 illustrates another example, non-limiting system 500 configured to selectively identify at least one radio that is causing the scrambling code conflict, according to an aspect. Included in system 500 is an evaluation component 502 that can be configured to eliminate radios in the set of radio pairs that comprise observed time difference reference values within an expected range of values. An expected range of values can be within (plus or minus) one or two chips of a calculated observed time difference reference value. For example, a range of calculated observed time difference reference values can be in the range of 15000 to 15004, for example, indicating that the sector is within a single bin frame.

In a UMTS network, for example, grid frames can be of arbitrary size and/or number. However, for simplicity, a bin grid frame size can be considered to be 100 meters by 100 meters for the purposes of discussion herein, as this closely matches current UMTS chip size (e.g., UMTS chip rate is 3.84 MBit/sec, therefore one chip is roughly 260.42 nsec and 78 meters). Additionally, a bin grid can comprise other bin grids or portions thereof. Moreover, bin grids may overlap wholly or partially and at any orientation. It is further noted that a bin grid can be physically two dimensional (2D) or three dimensional (3D), wherein a 2D grid can, for example, include x, y coordinates (e.g., latitude, longitude) and a 3D grid can add, for example, a z dimension (e.g., height).

In another implementation, evaluation component 502 can be configured to determine a single radio is associated with two sets of observed time difference reference values. For example, a first set can be in the range of 15000 to 15004, for example, and a second set can be within the range of 26000 to 26004, for example. This indicates that the timing measurements are associated with two (or more) different grid bins. In the example, there are two distinct sets of values that represent two different scrambling codes, which indicates a potential for scrambling code confusion. Thus, evaluation component 502 can be configured to isolate at least one radio as a cause of scrambling code confusion.

Figure 6:
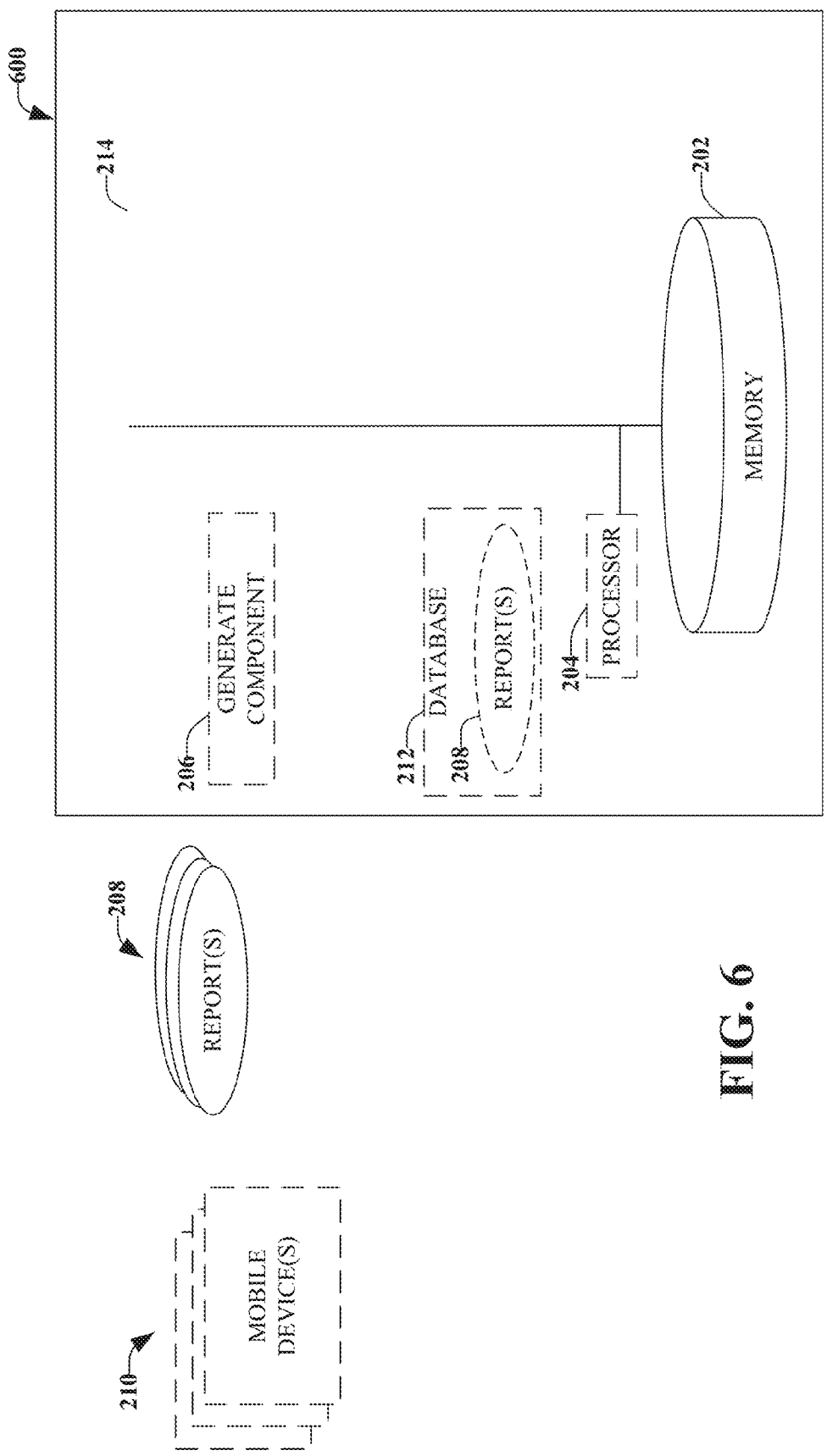
FIG. 6 illustrates an example, non-limiting system configured to automatically reassign scrambling codes in a wireless communications network to minimize scrambling code conflicts, according to an aspect.

FIG. 6 illustrates an example, non-limiting system 600 configured to automatically reassign scrambling codes in a wireless communications network to minimize scrambling code conflicts, according to an aspect. System 600 includes an distribution component 602 that can be configured to establish a different primary scrambling code for at least one radio, identified as causing a scrambling code conflict. For example, distribution component 602 can be configured to evaluate the scrambling codes of multiple sites, including both sites that are identified in the radio pairs as well as other sites that are located in a wireless communications network.

In an implementation, some networks can be self-configuring networks, wherein new base stations that are added to a network can be automatically configured and integrated into the network. The disclosed aspects can be utilized in the self-configuration networks to enable dynamic identification and configuration of scrambling codes to mitigate scrambling code confusion. In another implementation, some networks can be self-organizing networks, wherein scrambling codes can be dynamically established and/or modified through use of the various aspects disclosed herein.

Also included in system 600 can be an allocate component 604 that can be configured to assign the different primary scrambling code to at least one radio to remove the detected scrambling code conflict. In an implementation, the allocate component 604 can assign (or reconfigure) scrambling codes to other sites. For example, the distribution component 602, in order to mitigate the scrambling code conflict detected by one or more mobile devices, might determine that if one scrambling code is changed, such change will cause a different scrambling code conflict. Therefore, more than one scrambling code might need to be reassigned. Allocate component 604 can be configured to automatically reassign or change the scrambling codes for various sites as determined by the distribution component 602 or other system components.

Figure 7:
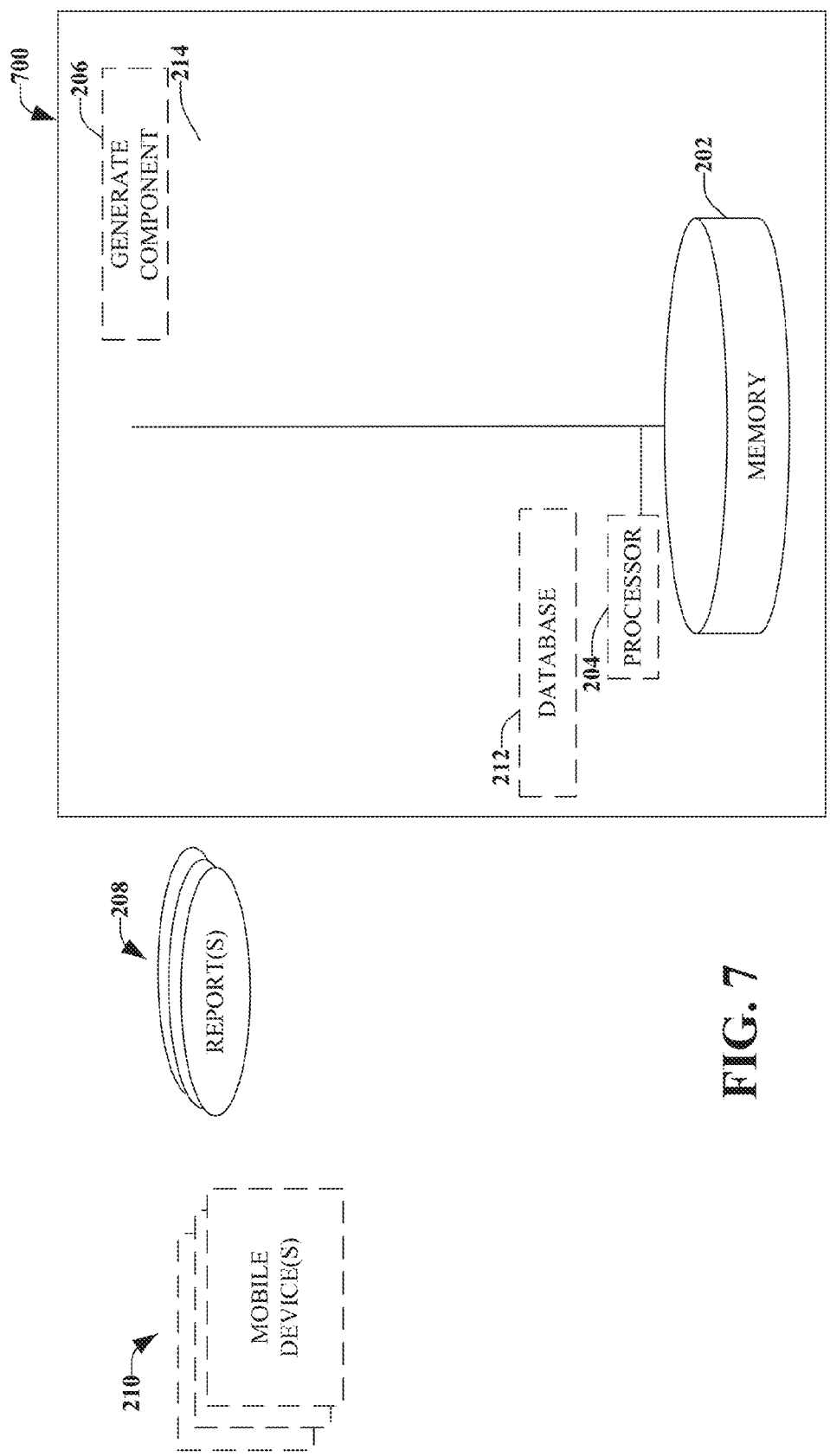
FIG. 7 illustrates an example, non-limiting system for detecting scrambling code conflicts while compensating for data reported erroneously, according to an aspect.

FIG. 7 illustrates an example, non-limiting system 700 for detecting scrambling code confusion while compensating for data reported erroneously, according to an aspect. System 700 is configured to detect a mobile device that is not reporting correct information, which can be due to the mobile device being defective and/or for other reasons (e.g., incorrect time measurements, and so forth). In order to mitigate the chances that erroneous data is utilized to detect a scrambling code conflict and thereby inappropriately skew the results, system 700 can include an outlier component 702 that can be configured to determine where one or more mobile devices are reporting vastly different measurements when compared with reported information from other mobile devices.

In an implementation, outlier component 702 can review the timing measurements received from each device and can cause other system components to ignore faulty measurements. For example, outlier component 702 can utilize outlier detection, which can include identifying timing measurements that are distinct from a set of other, substantially the same, timing measurements (e.g., timing measurements from the same sector, timing measurements at the same or similar location, and so forth). If one or more distinct timing measurements are discovered, outlier component 702 can remove (e.g., delete) the distinct timing measurement from the database 212.

In another implementation, outlier component 702 can be configured to flag the one or more timing measurements, wherein the flag instructs the other system components to ignore the flagged timing measurement. In some implementations, outlier component 702 can delete or flag all measurements (and associated sector pairs) from the mobile device that exhibits the potentially erroneous measurement reports.

Additionally or alternatively, system 700 can include an identifier component 704 that can be configured to separate the reports based on mobile type. For example, system 700 can be utilized to distinguish between mobile types in order to determine whether the measurements indicate scrambling code confusion or instead whether the measurements indicate that a particular mobile type is reporting widely different measurements than those measurements being reported by other mobile types.

Information related to the type of mobile device that is reporting the various information (e.g., timing measurements, position information, and so forth) can be derived by identifier component 704 based on the IMSI conveyed by the mobile device. For example, identifier component 704 can access a database or other storage media that cross references the IMSI to a mobile type. Identifier component 704 can separate the various reported information by mobile type. Over time, the reported information can be reviewed to determine whether a particular mobile type is providing incorrect measurements.

If it is determined that a particular mobile type is reporting incorrect information, outlier component 702 can remove the measurements and other reported information reported by mobile devices of the identified type. In another implementation, outlier component 702 can flag the information, which can be ignored by other system components when attempting to detect the presence of a site that is contributing to scrambling code confusion.

Additionally or alternatively, identifier component 704 can be configured to ascertain the type of mobile device providing the reports (e.g., timing information, primary scrambling code, and so forth). If the reports are received from a single mobile device type, the reports might not be considered. However, if the reports are received from two or more mobile devices of different types, the reports might be deemed acceptable to be analyzed for the presence of confusion caused by two sites being detected that share a common scrambling code as discussed herein.

Figure 8:
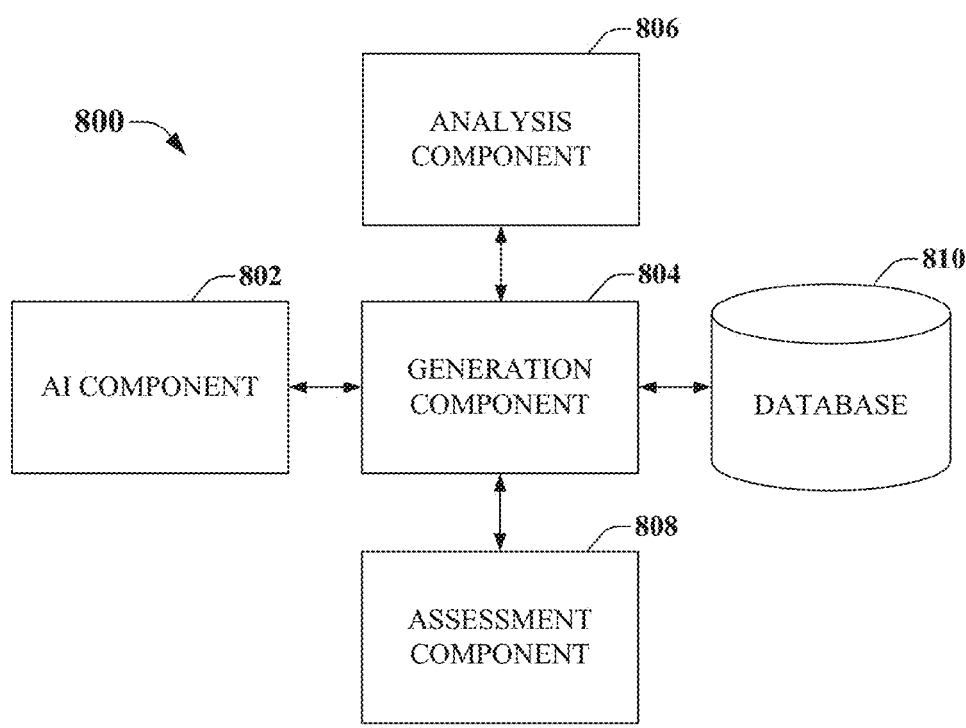
FIG. 8 illustrates an example, non-limiting system that employs an artificial intelligence component, which facilitates automating one or more features in accordance with the disclosed aspects.

FIG. 8 illustrates an example, non-limiting system 800 that employs an artificial intelligence (AI) component 802, which facilitates automating one or more features in accordance with the disclosed aspects. A generation component 804, an analysis component 806, an assessment component 808, a database 810, as well as other components (not illustrated) can include functionality, as more fully described herein, for example, with regard to the previous figures. The disclosed aspects (e.g., in connection with detecting sites that contribute to scrambling code confusion and/or detecting faulty mobile timing measurements) can employ various AI-based schemes for carrying out various aspects thereof. For example, a process for collecting timing measurements, primary scrambling codes, position information, and/or mobile device type information can be facilitated through an example automatic classifier system and process.

An example classifier can be a function that maps an input attribute vector, $x=(x1, x2, x3, x4, xn)$, to a confidence that the input belongs to a class, that is, $f(x)=confidence(class)$. Such classification can employ a probabilistic and/or statistical-based analysis (e.g., factoring into the analysis utilities and costs) to prognose or infer an action that should be automatically performed. In the case of communication systems, for example, attributes can be information stored in database 810, and the classes can be categories or areas of interest (e.g., timing measurements related to sector pairs).

A support vector machine (SVM) is an example of a classifier that can be employed. The SVM can operate by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches include, for example, naïve Bayes, Bayesian networks, decision trees, neural networks, fuzzy logic models, and probabilistic classification models providing different patterns of independence can be employed. Classification as used herein also may be inclusive of statistical regression that is utilized to develop models of priority.

As will be readily noted, the disclosed aspects can employ classifiers that are explicitly trained (e.g., through a generic training data) as well as implicitly trained (e.g., through observing timing measurements and other received data, receiving extrinsic information, and so on). For example, SVMs can be configured through a learning or training phase within a classifier constructor and feature selection module. Thus, the classifier(s) can be used to automatically learn and perform a number of functions, including but not limited to determining according to a predetermined criteria whether a pair of sites that utilize a same scrambling code has been detected, whether a type of mobile device is providing incorrect information, and so on. The criteria can include, but is not limited to, historical timing measurements, mobile device type, problems associated with soft handover within a wireless communications network, location of the mobile device, operating procedures associated with the network, and so on.

In view of the example systems shown and described herein, methods that may be implemented in accordance with the one or more of the disclosed aspects, will be better understood with reference to the following flow charts. While, for purposes of simplicity of explanation, the methods are shown and described as a series of blocks, it is to be understood that the disclosed aspects are not limited by the number or order of blocks, as some blocks may occur in different orders and/or at substantially the same time with other blocks from what is depicted and described herein. Moreover, not all illustrated blocks may be required to implement the methods described hereinafter. It is noted that the functionality associated with the blocks may be implemented by software, hardware, a combination thereof or any other suitable means (e.g. device, system, process, component). Additionally, it is also noted that the methods disclosed hereinafter and throughout this specification are capable of being stored on an article of manufacture to facilitate transporting and transferring such methodologies to various devices. Those skilled in the art will understand that a method could alternatively be represented as a series of interrelated states or events, such as in a state diagram. The various methods disclosed herein can be performed by a system comprising at least one processor.

Figure 9:
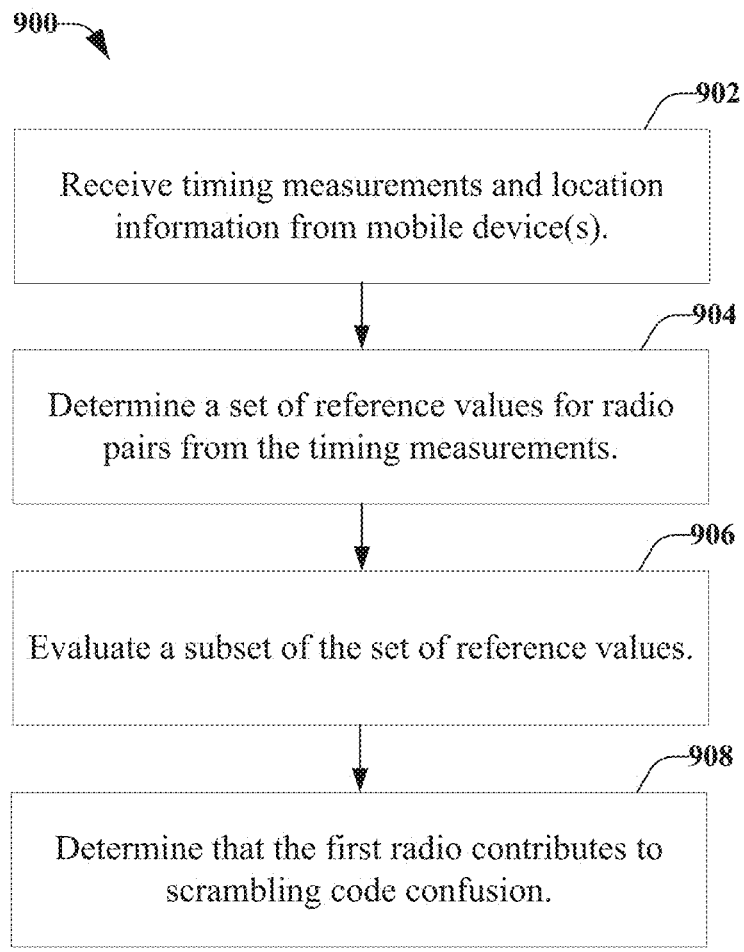
FIG. 9 illustrates a method for detection of scrambling code conflicts in a wireless communications network, according to an aspect.

FIG. 9 illustrates a method 900 for detection of scrambling code conflicts in a wireless communications network, according to an aspect. Method 900 starts, at 902, when timing measurements and location information is received from a plurality of mobile devices. In an aspect, the timing measurements comprise identification information of the respective radios.

At 904, a listing of reference values for radio pairs is determined The listing of reference values can be construed from the timing measurements. For example, the reference values can be created by matching a location of the mobile device (e.g., from the received location information). Each timing measurement in the set of timing measurements can be associated with a radio identified by a primary scrambling code. The radio pairs can be created from the radios identified in the set of timing measurements. An observed time difference can be calculated for each pair of radios and a propagation delay can be removed from the observed time difference value to derive the reference value. In an implementation, the reference value can be retained in a database with other reference values.

A first subset of the set of reference values are evaluated, at 906. The first subset of the set of reference values can comprise a first radio. Based on the comparison, at 908, it is determined that the first radio contributes to at least a set of the plurality of mobile devices receiving communication from two radios that use a same scrambling code resulting in scrambling code confusion.

Figure 10:
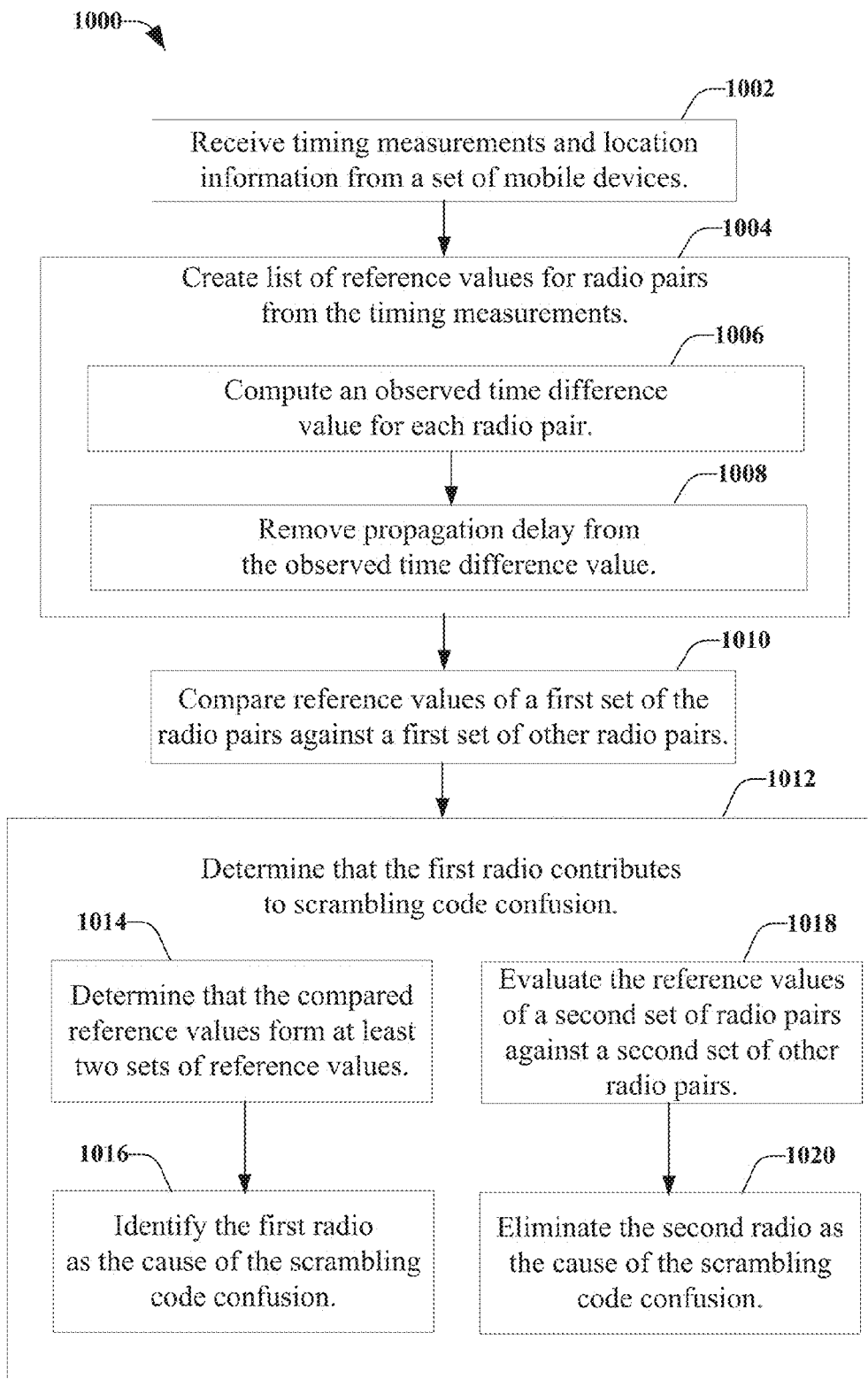
FIG. 10 illustrates an example, non-limiting method for identifying at least one radio that is causing the scrambling code conflict, according to an aspect.

FIG. 10 illustrates an example, non-limiting method 1000 for identifying at least one radio that is causing the scrambling code conflict, according to an aspect. At 1002, timing measurements and location information is received from a set of mobile devices. A list of reference values for radio pairs can be constructed from the timing measurements, at 1004. In an implementation, constructing the list of reference values can comprise computing, at 1006, an observed time difference value for each radio pair. At 1008, a propagation delay is removed from the observed time difference value for each radio pair to create the list of reference values.

The reference values of the first set of radio pairs is compared against a first set of other radio pairs, at 1010. The first set of radio pairs and the first set of other radio pairs comprise a similar radio. At 1012, a determination is made that the first radio is a contributing factor in the radio scrambling code confusion.

In an implementation, the determination, at 1012, includes determining that the compared reference values form at least two sets of reference values, at 1014. Based on the two sets of reference values, at 1016, the first radio is identified as a cause of the scrambling code conflict.

According to another implementation, the determination, at 1012, includes evaluating the reference values of a second set of the radio pairs against a second set of other radio pairs, at 1018. The second set of the radio pairs and the second set of other radio pairs each comprise a second radio. At 1020, the second radio is eliminated as the cause of the scrambling code confusion. For example, the second radio might have a single set of reference values that are within a certain tolerance range.

Figure 11:
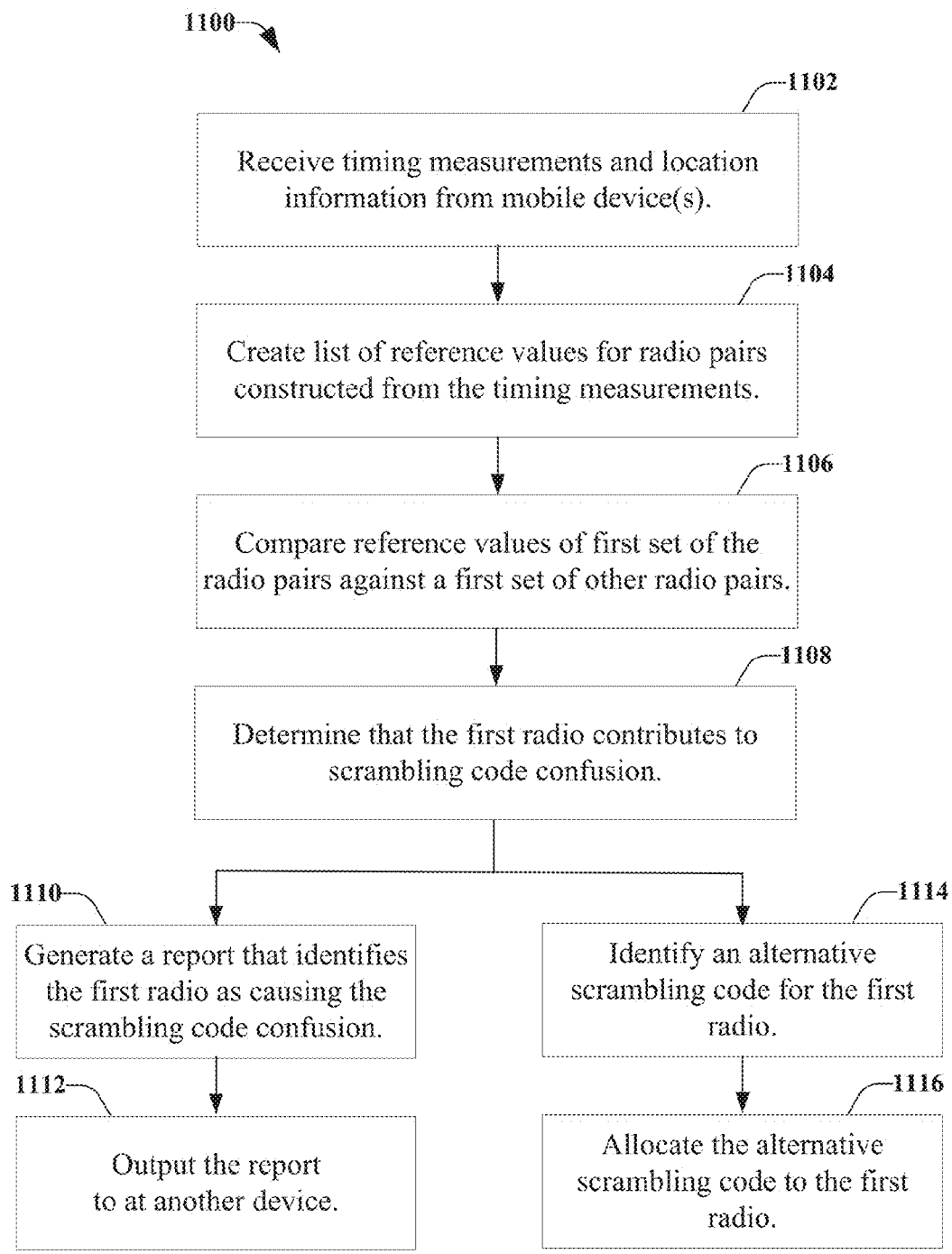
FIG. 11 illustrates an example, non-limiting method for causing one or more actions to be performed based on detection of scrambling code confusion, according to an aspect.

FIG. 11 illustrates an example, non-limiting method 1100 for causing one or more actions to be performed based on detection of scrambling code confusion, according to an aspect. At 1102, timing measurements and location information is received from mobile devices. A list of reference values is created, at 1104, from the timing measurements. The reference values of a first set of the radio pairs is compared against a first set of other radio pairs, at 1106. The timing measurements received can be measurements taken by the respective mobile device for radios that are identified by their primary scrambling code. For example, the timing measurements that are measured by a first device can be for radios A, B, C, and D and the first set of radio pairs can be created that include radio pairs $AB_1$, $AC_1$, $AD_1$, $BA_1$, $BC_1$, $BD_1$, $CA_1$, $CB_1$, $CD_1$, $DA_1$, $DB_1$, and $DC_1$, where subscript 1 indicates the first radio. Further, a second radio can measure and report timing measurements for radios A, C, and D. Based on these reported timing measurements a first set of other radio pairs can be created that include radio pairs $AC_2$, $AD_2$, $CA_2$, $CD_2$, $DA_2$, and $DC_2$, where subscript 2 indicates the second radio. A subset of the first set of radio pairs is compared against a subset of the first set of other radio pairs. For example, to evaluate radio C, a subset of the first set of radio pairs ($AC_1$, $BC_1$, $CA_1$, $CB_1$, $CD_1$ and $CD_1$) is compared against a subset of the first set of other radio pairs ($AC_2$, $CA_2$, $CD_2$, $DC_2$), where C is the common radio between the pairs.

A determination is made, at 1108, that the first radio contributes to a scrambling code conflict. In an implementation, method 1110 can include generating, at 1110, a report that identifies the first radio as causing the scrambling code confusion. The report can be output, at 1112, to another device, which can be a device of a network planner. Upon receipt of the report, the network planner can update the scrambling reuse plan in an attempt to mitigate scrambling code conflicts.

In another implementation, at 1114, an alternative scrambling code can automatically be identified for the first radio. At 1116, the alternative scrambling code can be allocated to the first radio. For example, the radio might be included in a self-configuring network, wherein when new base stations are added and/or confusion is identified, the network dynamically changes one or more parameters in order to configure the network for better performance.

Figure 12:
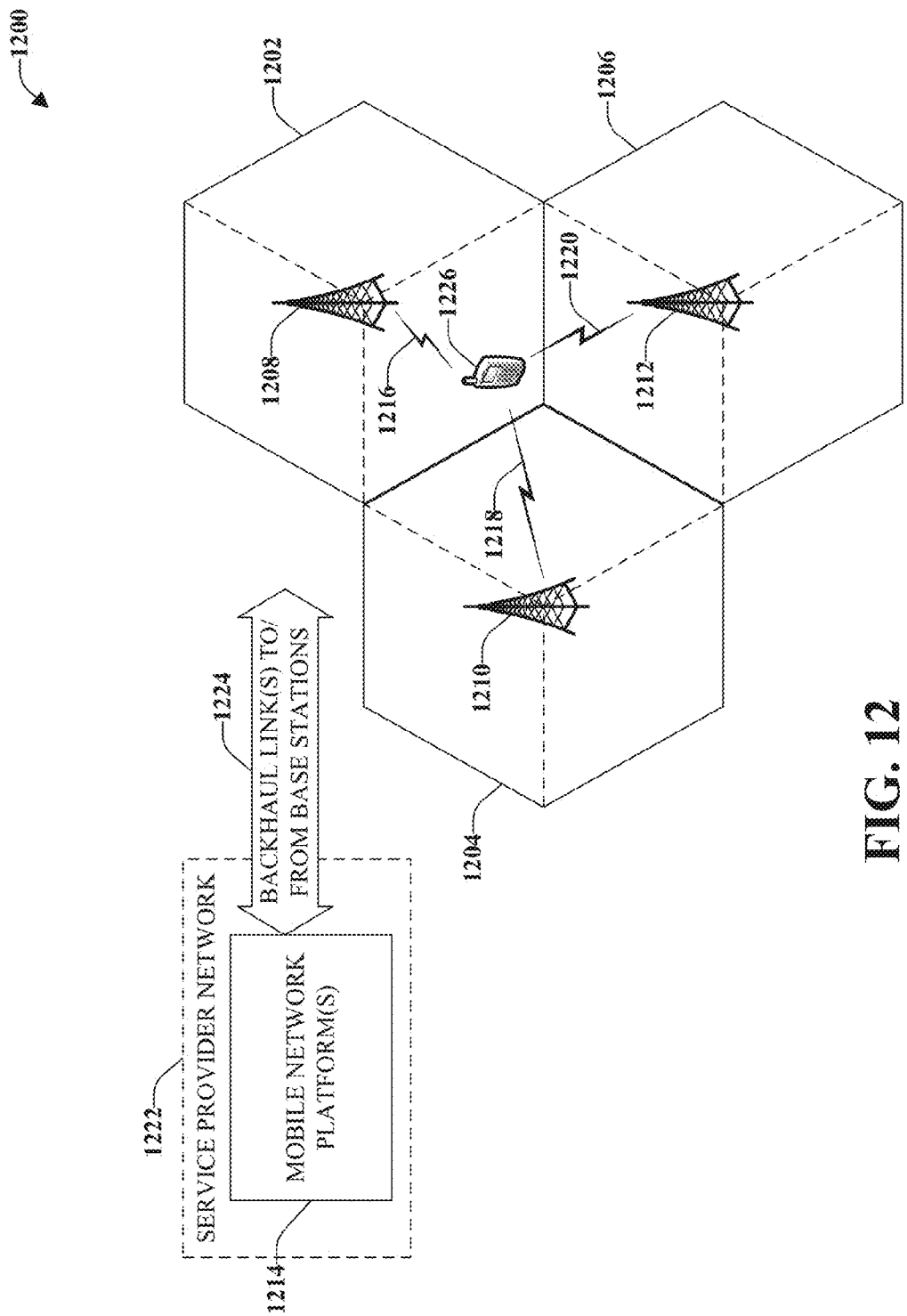
FIG. 12 illustrates a schematic example wireless environment that can operate in accordance with aspects described herein.

By way of further description with respect to one or more non-limiting ways to detect scrambling code conflicts, FIG. 12 is a schematic example wireless environment 1200 that can operate in accordance with aspects described herein. In particular, example wireless environment 1200 illustrates a set of wireless network macro cells. Three coverage macro cells 1202, 1204, and 1206 include the illustrative wireless environment; however, it is noted that wireless cellular network deployments can encompass any number of macro cells. Coverage macro cells 1202, 1204, and 1206 are illustrated as hexagons; however, coverage cells can adopt other geometries generally dictated by a deployment configuration or floor plan, geographic areas to be covered, and so on. Each macro cell 1202, 1204, and 1206 is sectorized in a 2π/3 configuration in which each macro cell includes three sectors, demarcated with dashed lines in FIG. 12. It is noted that other sectorizations are possible, and aspects or features of the disclosed subject matter can be exploited regardless of type of sectorization. Macro cells 1202, 1204, and 1206 are served respectively through base stations or eNodeBs 1208, 1210, and 1212. Any two eNodeBs can be considered an eNodeB site pair (NBSP). It is noted that radio component(s) are functionally coupled through links such as cables (e.g., RF and microwave coaxial lines), ports, switches, connectors, and the like, to a set of one or more antennas that transmit and receive wireless signals (not illustrated). It is noted that a radio network controller (not shown), which can be a part of mobile network platform(s) 1214, and set of base stations (e.g., eNode B 1208, 1210, and 1212) that serve a set of macro cells; electronic circuitry or components associated with the base stations in the set of base stations; a set of respective wireless links (e.g., links 1216, 1218, and 1220) operated in accordance to a radio technology through the base stations, form a macro radio access network (RAN). It is further noted that, based on network features, the radio controller can be distributed among the set of base stations or associated radio equipment. In an aspect, for UMTS-based networks, wireless links 1216, 1218, and 1220 embody a Uu interface (UMTS Air Interface).

Mobile network platform(s) 1214 facilitates circuit switched (CS)-based (e.g., voice and data) and packet-switched (PS) (e.g., internet protocol (IP), frame relay, or asynchronous transfer mode (ATM)) traffic and signaling generation, as well as delivery and reception for networked telecommunication, in accordance with various radio technologies for disparate markets. Telecommunication is based at least in part on standardized protocols for communication determined by a radio technology utilized for communication. In addition, telecommunication can exploit various frequency bands, or carriers, which include any EM frequency bands licensed by the service provider network 1222 (e.g., personal communication services (PCS), advanced wireless services (AWS), general wireless communications service (GWCS), and so forth), and any unlicensed frequency bands currently available for telecommunication (e.g., the 2.4 GHz industrial, medical and scientific (IMS) band or one or more of the 5 GHz set of bands). In addition, mobile network platform(s) 1214 can control and manage base stations 1208, 1210, and 1212 and radio component(s) associated thereof, in disparate macro cells 1202, 1204, and 1206 by way of, for example, a wireless network management component (e.g., radio network controller(s), cellular gateway node(s), etc.) Moreover, wireless network platform(s) can integrate disparate networks (e.g., femto network(s), Wi-Fi network(s), femto cell network(s), broadband network(s), service network(s), enterprise network(s), and so on). In cellular wireless technologies (e.g., 3rd Generation Partnership Project (3GPP) Universal Mobile Telecommunication System (UMTS), Global System for Mobile Communication (GSM)), mobile network platform 1214 can be embodied in the service provider network 1222.

In addition, wireless backhaul link(s) 1224 can include wired link components such as T1/E1 phone line; a digital subscriber line (DSL) either synchronous or asynchronous; an asymmetric DSL (ADSL); an optical fiber backbone; a coaxial cable, etc.; and wireless link components such as line-of-sight (LOS) or non-LOS links which can include terrestrial air-interfaces or deep space links (e.g., satellite communication links for navigation). In an aspect, for UMTS-based networks, wireless backhaul link(s) 1224 embodies IuB interface.

It is noted that while example wireless environment 1200 is illustrated for macro cells and macro base stations, aspects, features and advantages of the disclosed subject matter can be implemented in microcells, picocells, femto cells, or the like, wherein base stations are embodied in home-based equipment related to access to a network.

Figure 13:
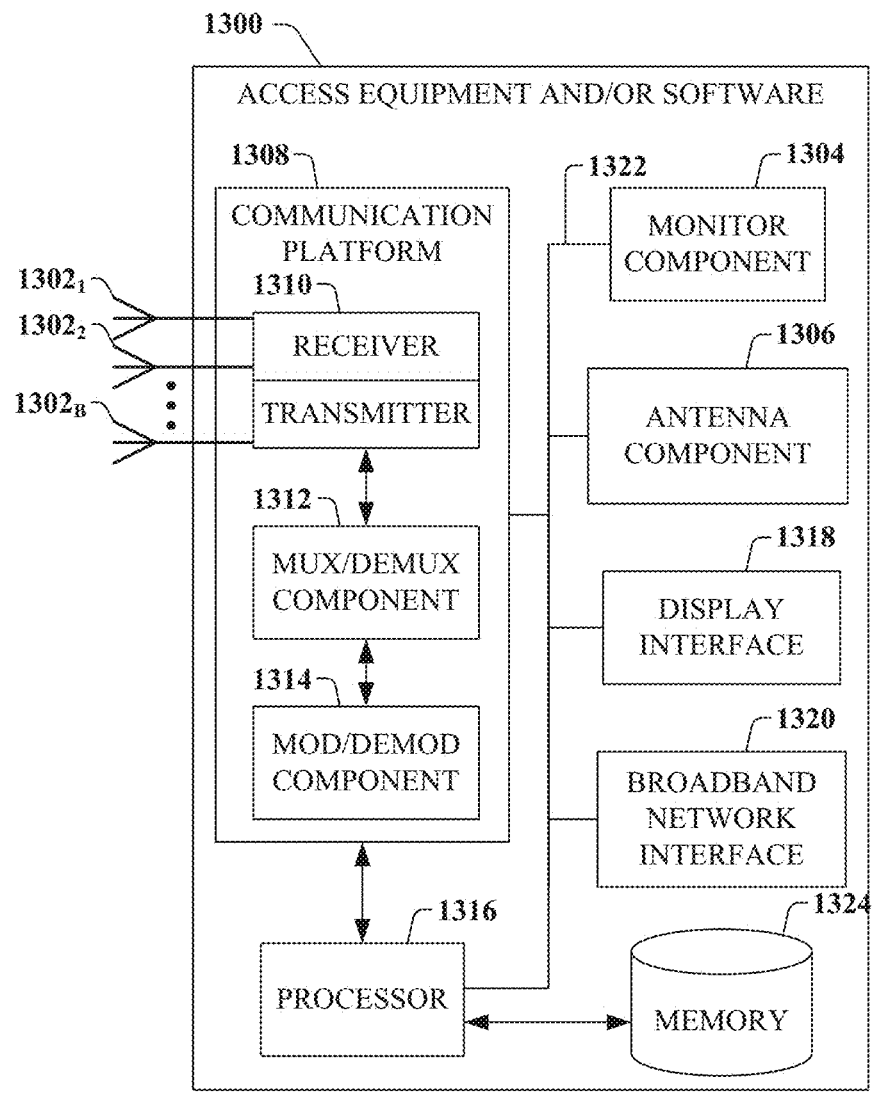
FIG. 13 illustrates a block diagram of access equipment and/or software related to access of a network, in accordance with an embodiment.

To provide further context for various aspects of the disclosed subject matter, FIG. 13 illustrates a block diagram of an embodiment of access equipment and/or software 1300 related to access of a network (e.g., base station, wireless access point, femtocell access point, and so forth) that can enable and/or exploit features or aspects of the disclosed aspects.

Access equipment and/or software 1300 related to access of a network can receive and transmit signal(s) from and to wireless devices, wireless ports, wireless routers, etc. through segments $1302_1$-$1302_B$ (B is a positive integer). Segments $1302_1$-$1302_B$ can be internal and/or external to access equipment and/or software 1300 related to access of a network, and can be controlled by a monitor component 1304 and an antenna component 1306. Monitor component 1304 and antenna component 1306 can couple to communication platform 1308, which can include electronic components and associated circuitry that provide for processing and manipulation of received signal(s) and other signal(s) to be transmitted.

In an aspect, communication platform 1308 includes a receiver/transmitter 1310 that can convert analog signals to digital signals upon reception of the analog signals, and can convert digital signals to analog signals upon transmission. In addition, receiver/transmitter 1310 can divide a single data stream into multiple, parallel data streams, or perform the reciprocal operation. Coupled to receiver/transmitter 1310 can be a multiplexer/demultiplexer 1312 that can facilitate manipulation of signals in time and frequency space. Multiplexer/demultiplexer 1312 can multiplex information (data/traffic and control/signaling) according to various multiplexing schemes such as time division multiplexing (TDM), frequency division multiplexing (FDM), orthogonal frequency division multiplexing (OFDM), code division multiplexing (CDM), space division multiplexing (SDM). In addition, multiplexer/demultiplexer component 1312 can scramble and spread information (e.g., codes, according to substantially any code known in the art, such as Hadamard-Walsh codes, Baker codes, Kasami codes, polyphase codes, and so forth).

A modulator/demodulator 1314 is also a part of communication platform 1308, and can modulate information according to multiple modulation techniques, such as frequency modulation, amplitude modulation (e.g., M-ary quadrature amplitude modulation (QAM), with M a positive integer); phase-shift keying (PSK); and so forth).

Access equipment and/or software 1300 related to access of a network also includes a processor 1316 configured to confer, at least in part, functionality to substantially any electronic component in access equipment and/or software 1300. In particular, processor 1316 can facilitate configuration of access equipment and/or software 1300 through, for example, monitor component 1304, antenna component 1306, and one or more components therein. Additionally, access equipment and/or software 1300 can include display interface 1318, which can display functions that control functionality of access equipment and/or software 1300, or reveal operation conditions thereof. In addition, display interface 1318 can include a screen to convey information to an end user. In an aspect, display interface 1318 can be an LCD (Liquid Crystal Display), a plasma panel, a monolithic thin-film based electrochromic display, and so on. Moreover, display interface 1318 can include a component (e.g., speaker) that facilitates communication of aural indicia, which can also be employed in connection with messages that convey operational instructions to an end user. Display interface 1318 can also facilitate data entry (e.g., through a linked keypad or through touch gestures), which can cause access equipment and/or software 1300 to receive external commands (e.g., restart operation).

Broadband network interface 1320 facilitates connection of access equipment and/or software 1300 to a service provider network (not shown) that can include one or more cellular technologies (e.g., 3GPP UMTS, GSM, and so on.) through backhaul link(s) (not shown), which enable incoming and outgoing data flow. Broadband network interface 1320 can be internal or external to access equipment and/or software 1300, and can utilize display interface 1318 for end-user interaction and status information delivery.

Processor 1316 can be functionally connected to communication platform 1308 and can facilitate operations on data (e.g., symbols, bits, or chips) for multiplexing/demultiplexing, such as effecting direct and inverse fast Fourier transforms, selection of modulation rates, selection of data packet formats, inter-packet times, and so on. Moreover, processor 1316 can be functionally connected, through data, system, or an address bus 1322, to display interface 1318 and broadband network interface 1320, to confer, at least in part, functionality to each of such components.

In access equipment and/or software 1300, memory 1324 can retain location and/or coverage area (e.g., macro sector, identifier(s)), access list(s) that authorize access to wireless coverage through access equipment and/or software 1300, sector intelligence that can include ranking of coverage areas in the wireless environment of access equipment and/or software 1300, radio link quality and strength associated therewith, or the like. Memory 1324 also can store data structures, code instructions and program modules, system or device information, code sequences for scrambling, spreading and pilot transmission, access point configuration, and so on. Processor 1316 can be coupled (e.g., through a memory bus) to memory 1324 in order to store and retrieve information used to operate and/or confer functionality to the components, platform, and interface that reside within access equipment and/or software 1300.

As it employed in the subject specification, the term "processor" can refer to substantially any computing processing unit or device including, but not limited to including, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions and/or processes described herein. Processors can exploit nano-scale architectures such as, but not limited to, molecular and quantum-dot based transistors, switches and gates, in order to optimize space usage or enhance performance of mobile devices. A processor may also be implemented as a combination of computing processing units.

In the subject specification, terms such as "store," "data store," data storage," "database," and substantially any other information storage component relevant to operation and functionality of a component and/or process, refer to "memory components," or entities embodied in a "memory," or components including the memory. It is noted that the memory components described herein can be either volatile memory or nonvolatile memory, or can include both volatile and nonvolatile memory.

By way of illustration, and not limitation, nonvolatile memory, for example, can be included in memory 1324, non-volatile memory (see below), disk storage (see below), and memory storage (see below). Further, nonvolatile memory can be included in read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to include, without being limited to including, these and any other suitable types of memory.

Figure 14:
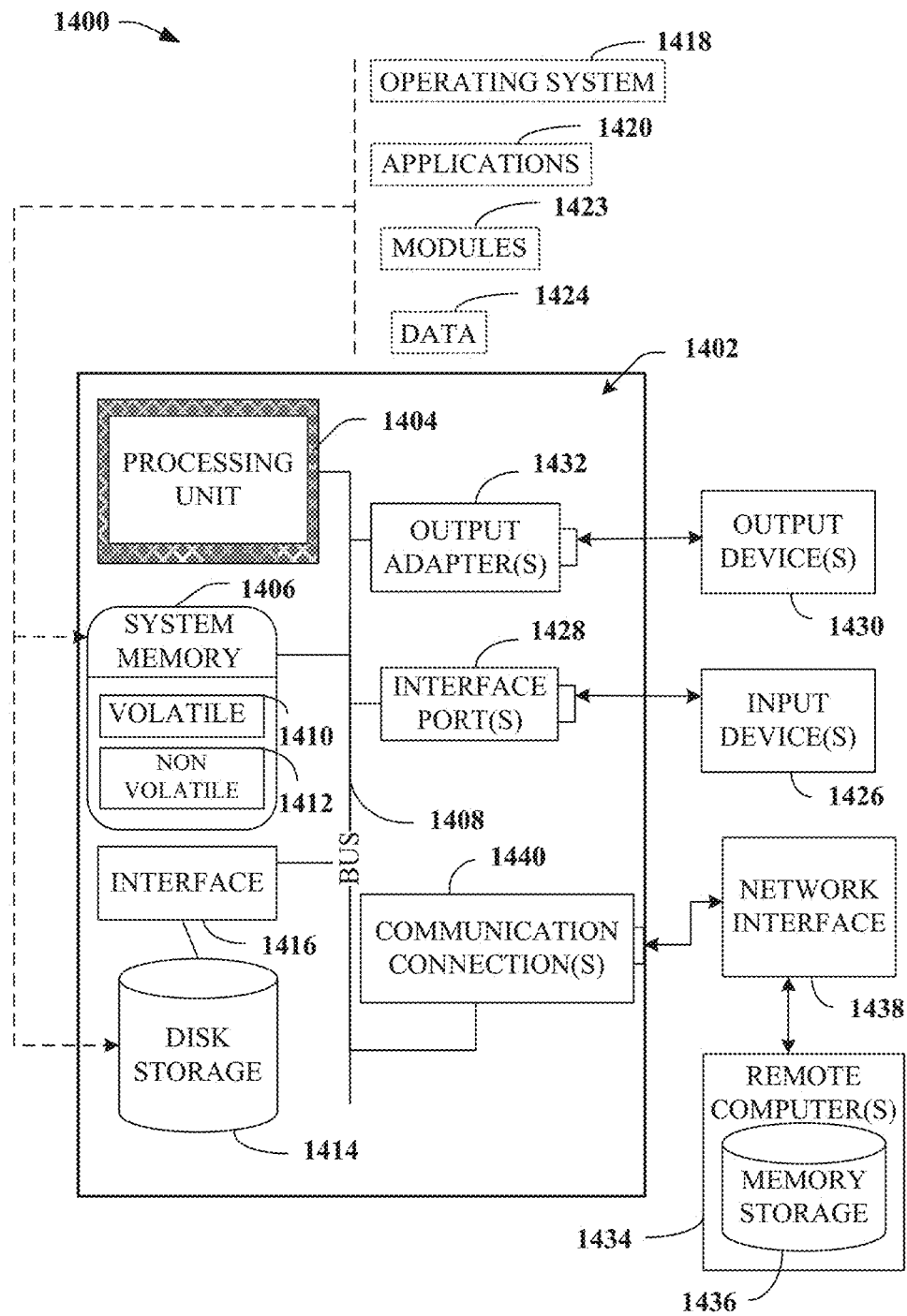
FIG. 14 illustrates a block diagram of a computing system, in accordance with an embodiment.

In order to provide a context for the various aspects of the disclosed subject matter, FIG. 14, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the various aspects also can be implemented in combination with other program modules. Generally, program modules include routines, programs, components, data structures, etc. that perform particular tasks and/or implement particular abstract data types. For example, in memory (such as memory 202) there can be software, which can instruct a processor (such as processor 204) to perform various actions. The processor can be configured to execute the instructions in order to implement the analysis of monitoring an uplink power level, detecting the uplink power level is at or above a threshold level, and/or disable transmission of at least one message as a result of the monitored uplink power level.

Moreover, those skilled in the art will understand that the various aspects can be practiced with other computer system configurations, including single-processor or multiprocessor computer systems, mini-computing devices, mainframe computers, as well as personal computers, base stations hand-held computing devices or user equipment, such as a PDA, phone, watch, and so forth, microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

With reference to FIG. 14, a block diagram of a computing system 1400 operable to execute the disclosed systems and methods is illustrated, in accordance with an embodiment. Computer 1402 includes a processing unit 1404, a system memory 1406, and a system bus 1408. System bus 1408 couples system components including, but not limited to, system memory 1406 to processing unit 1404. Processing unit 1404 can be any of various available processors. Dual microprocessors and other multiprocessor architectures also can be employed as processing unit 1404.

System bus 1408 can be any of several types of bus structure(s) including a memory bus or a memory controller, a peripheral bus or an external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1194), and Small Computer Systems Interface (SCSI).

System memory 1406 includes volatile memory 1410 and nonvolatile memory 1412. A basic input/output system (BIOS), containing routines to transfer information between elements within computer 1402, such as during start-up, can be stored in nonvolatile memory 1412. By way of illustration, and not limitation, nonvolatile memory 1412 can include ROM, PROM, EPROM, EEPROM, or flash memory. Volatile memory 1410 can include RAM, which acts as external cache memory. By way of illustration and not limitation, RAM is available in many forms such as SRAM, dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1402 also includes removable/non-removable, volatile/non-volatile computer storage media. In an implementation, the non-transitory computer-readable storage medium can store computer-executable instructions that, in response to execution, cause a system including a processor to perform operations. The operations can include storing a plurality of observed time difference reference values for a plurality of radio pairs based on timing measurements and location information reported by a plurality of mobile devices. The operations can also include comparing the plurality of observed time difference reference values for sets of radio pairs of the plurality of radio pairs. The sets of radio pairs share a common radio. The operations can also include identifying the common radio as a cause of scrambling code confusion resulting from two radios using a same scrambling code.

In an implementation, the operations can also include associating a location of a mobile device of the plurality of mobile devices to a set of timing measurements reported by the mobile device. The set of timing measurements are associated with a group of radios identified by a set of primary scrambling codes. Further to this implementation, the operations can include creating a first set of radio pairs from the group of radios associated with the set of timing measurements and determining a first set of observed time difference values for the first set of radio pairs. The operations can also include removing propagation delays from the first set of observed time difference values to determine a first set of observed time difference reference values and populating a data store with the first set of observed time difference reference values for the first set of radio pairs.

According to another implementation, a pair of radios comprises a first radio and a second radio and wherein the operations further comprise subtracting a first timing measurement of the first radio from a second timing measurement of the second radio to calculate the observed time difference value between the first radio and the second radio. In a further implementation, the operations can include establishing a different primary scrambling code for the common radio and assigning the different primary scrambling code to the common radio to mitigate the scrambling code confusion.

FIG. 14 illustrates the removable/non-removable, volatile/non-volatile computer storage media as, for example, disk storage 1414. Disk storage 1414 includes, but is not limited to, devices such as a magnetic disk drive, floppy disk drive, tape drive, Jaz drive, Zip drive, LS-100 drive, flash memory card, or memory stick. In addition, disk storage 1414 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 1414 to system bus 1408, a removable or non-removable interface is typically used, such as interface component 1416.

It is to be noted that FIG. 14 describes software that acts as an intermediary between users and computer resources described in suitable operating environment. Such software includes an operating system 1418. Operating system 1418, which can be stored on disk storage 1414, acts to control and allocate resources of computer system 1402. System applications 1420 can take advantage of the management of resources by operating system 1418 through program modules 1422 and program data 1424 stored either in system memory 1406 or on disk storage 1414. It is to be understood that the disclosed subject matter can be implemented with various operating systems or combinations of operating systems.

A user can enter commands or information, for example through interface component 1416, into computer system 1402 through input device(s) 1426. Input devices 1426 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to processing unit 1404 through system bus 1408 through interface port(s) 1428. Interface port(s) 1428 include, for example, a serial port, a parallel port, a game port, and a universal serial bus (USB). Output device(s) 1430 use some of the same type of ports as input device(s) 1426.

Thus, for example, a USB port can be used to provide input to computer 1402 and to output information from computer 1402 to an output device 1430. Output adapter 1432 is provided to illustrate that there are some output devices 1430, such as monitors, speakers, and printers, among other output devices 1430, which use special adapters. Output adapters 1432 include, by way of illustration and not limitation, video and sound cards that provide means of connection between output device 1430 and system bus 1408. It is also noted that other devices and/or systems of devices provide both input and output capabilities such as remote computer(s) 1434.

Computer 1402 can operate in a networked environment using logical connections to one or more remote computers, such as remote computer(s) 1434. Remote computer(s) 1434 can be a personal computer, a server, a router, a network PC, a workstation, a microprocessor based appliance, a peer device, or other common network node and the like, and typically includes many or all of the elements described relative to computer 1402.

For purposes of brevity, only one memory storage device 1436 is illustrated with remote computer(s) 1434. Remote computer(s) 1434 is logically connected to computer 1402 through a network interface 1438 and then physically connected through communication connection 1440. Network interface 1438 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1440 refer(s) to hardware/software employed to connect network interface 1438 to system bus 1408. While communication connection 1440 is shown for illustrative clarity inside computer 1402, it can also be external to computer 1402. The hardware/software for connection to network interface 1438 can include, for example, internal and external technologies such as modems, including regular telephone grade modems, cable modems and DSL modems, ISDN adapters, and Ethernet cards.

It is to be noted that aspects, features, or advantages of the aspects described in the subject specification can be exploited in substantially any communication technology. For example, 4G technologies, Wi-Fi, WiMAX, Enhanced GPRS, 3GPP LTE, 3GPP2 UMB, 3GPP UMTS, HSPA, HSDPA, HSUPA, GERAN, UTRAN, LTE Advanced. Additionally, substantially all aspects disclosed herein can be exploited in legacy telecommunication technologies; e.g., GSM. In addition, mobile as well non-mobile networks (e.g., Internet, data service network such as IPTV) can exploit aspect or features described herein.

Various aspects or features described herein can be implemented as a method, apparatus, or article of manufacture using standard programming and/or engineering techniques. In addition, various aspects disclosed in the subject specification can also be implemented through program modules stored in a memory and executed by a processor, or other combination of hardware and software, or hardware and firmware.

Other combinations of hardware and software or hardware and firmware can enable or implement aspects described herein, including disclosed method(s). The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical discs (e.g., compact disc (CD), digital versatile disc (DVD), blu-ray disc (BD) . . . ), smart cards, and flash memory devices (e.g., card, stick, key drive . . . ).

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., through access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

What has been described above includes examples of systems and methods that provide advantages of the one or more aspects. It is, of course, not possible to describe every conceivable combination of components or methods for purposes of describing the aspects, but one of ordinary skill in the art may recognize that many further combinations and permutations of the claimed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

As used in this application, the terms "component," "system," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration, both an application running on a server or network controller, and the server or network controller can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software, or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components. As further yet another example, interface(s) can include input/output (I/O) components as well as associated processor, application, or Application Programming Interface (API) components.

The term "set", "subset", or the like as employed herein excludes the empty set (e.g., the set with no elements therein). Thus, a "set", "subset", or the like includes one or more elements or periods, for example. As an illustration, a set of periods includes one or more periods; a set of transmissions includes one or more transmissions; a set of resources includes one or more resources; a set of messages includes one or more messages, and so forth.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

What is claimed is:

1. A system, comprising:
   a processor; and
   a memory that stores executable instructions that, when executed by the processor, facilitate performance of operations, comprising:
      generating reference values associated with a transmission time difference of a radio pair;
      generating other reference values associated with another transmission time difference of another radio pair;
      comparing the reference values to the other reference values, resulting in comparison data;
      determining that the other radio pair contributes to a transmission interference based on the comparison data;
      identifying a scrambling code for the other radio pair in response to the determining that the other radio pair contributes to the transmission interference; and
      allocating the scrambling code to the other radio pair.

2. The system of claim 1, wherein the reference values and the other reference values comprises radio identification data representative of a radio identification.

3. The system of claim 1, wherein the reference values are generated by matching location data from a mobile device to the reference values.

4. The system of claim 3, wherein the operations further comprise:
   generating a location report, based on the location data, that identifies geographic coordinates of the mobile device.

5. The system of claim 4, wherein the geographic coordinates comprise an altitude data associated with an altitude of the mobile device.

6. The system of claim 1, wherein the operations further comprise:
   determining that the radio pair contributes to the transmission interference based on the comparison data.

7. The system of claim 1, wherein the other radio pair comprises the other reference values within a tolerance range.

8. The system of claim 1, wherein first radio pairs are compared to second radio pairs different than the first radio pairs.

9. The system of claim 1, wherein the operations further comprise:
   generating report data that identifies the radio pair as causing the transmission interference.

10. The system of claim 9, wherein the report data is transmitted to a mobile device to decrease the transmission interference.

11. The system of claim 10, wherein other data is generated to identify the mobile device and a longitude associated with the mobile device.

12. A method, comprising:
   generating, by a system comprising a processor, reference value data based on time data and location data associated with a radio pair of radio pairs;
   generating, by the system, first time difference data representative of a first time difference of respective transmissions of the radio pair based on the reference value data;
   generating, by the system, second time difference data representative of a second time difference of respective transmissions of another radio pair of the radio pairs based on other reference value data;
   comparing, by the system, the first time difference data to the second time difference data resulting in comparison data;
   based on the comparison data, determining, by the system, that the other radio pair of the radio pairs is causing a transmission interference, wherein the transmission interference is associated with a scrambling code; and
   assigning, by the system, another scrambling code to the other radio pair in response to the determining that the other radio pair of the radio pairs is causing the transmission interference.

13. The method of claim 12, wherein the generating comprises:
   generating the scrambling code via a classification process.

14. The method of claim 13, wherein the classification process comprises an artificial intelligence process.

15. The method of claim 12, further comprising:
collecting, by the system, the first time difference data and the second time difference data using artificial intelligence.

16. The method of claim 12, further comprising:
generating, by the system, the scrambling code in response to the determining that the other radio pair of the radio pairs is causing the transmission interference.

17. A non-transitory machine-readable storage medium, comprising executable instructions that, when executed by a processor, facilitate performance of operations, comprising: determining first reference data related to a first radio pair, wherein the first reference data is associated with time data; determining second reference data related to a second radio pair, wherein the second reference data is associated with other time data; comparing the first reference data to the second reference data resulting in comparison data; determining that the first radio pair interferes with a transmission based on the comparison data; reassigning a scrambling code of the first radio pair in response to the determining that the first radio pair interferes with the transmission; and updating a scrambling code reuse data structure in response to the reassigning the scrambling code.

18. The non-transitory machine-readable storage medium of claim 17, wherein the operations further comprise: reserving another scrambling code for the second radio pair in response to the determining that the first radio pair interferes with the transmission.

19. The non-transitory machine-readable storage medium of claim 17, wherein the operations further comprise: determining that the second radio pair does not contribute to a transmission interference.

20. The non-transitory machine-readable storage medium of claim 19, wherein the operations further comprise: generating a report that identifies the second radio pair as not contributing to the transmission interference; and outputting the report to another device.

\* \* \* \* \*